United States Patent
Takemoto et al.

(10) Patent No.: US 7,542,088 B2
(45) Date of Patent: Jun. 2, 2009

(54) IMAGE BLUR CORRECTION CAMERA AND METHOD FOR CONTROLLING OF IMAGE BLUR CORRECTION

(75) Inventors: Masami Takemoto, Shinjuku-ku (JP); Hiroyuki Tomita, Yokohama (JP); Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 142 days.

(21) Appl. No.: 11/510,579

(22) Filed: Aug. 28, 2006

(65) Prior Publication Data

US 2006/0284984 A1 Dec. 21, 2006

Related U.S. Application Data

(63) Continuation of application No. 09/987,733, filed on Nov. 15, 2001, now abandoned.

(30) Foreign Application Priority Data

Nov. 17, 2000 (JP) ............................. 2000-350715

(51) Int. Cl.
H04N 5/222 (2006.01)

(52) U.S. Cl. ............................. 348/333.08; 348/208.99

(58) Field of Classification Search ................. 396/51; 348/373–375

See application file for complete search history.

(56) References Cited

U.S. PATENT DOCUMENTS

| 5,585,884 A | * 12/1996 | Onuki ......................... 396/51 |
| 6,085,039 A | 7/2000 | Hamada et al. |
| 6,091,450 A | 7/2000 | Hirasawa |
| 6,628,898 B2 | 9/2003 | Endo |

FOREIGN PATENT DOCUMENTS

JP  A 09-080532  3/1997

* cited by examiner

*Primary Examiner*—Tuan V Ho
(74) *Attorney, Agent, or Firm*—Oliff & Berridge, PLC

(57) ABSTRACT

A used viewfinder determination section determines whether an optical viewfinder is being used or if a liquid crystal monitor is being used, based upon signals from an eye approach detection section. A blur correction operation changing section changes a blur correction operation by a blur correction lens in accordance with determination results from the used viewfinder determination section. When it is determined that the optical viewfinder is not being used, a blur correction operation using the blur correction lens is not carried out.

28 Claims, 12 Drawing Sheets

IMAGE BLUR CORRECTION CAMERA AND METHOD FOR CONTROLLING OF IMAGE BLUR CORRECTION

INCORPORATION BY REFERENCE

This is a Continuation of U.S. patent application Ser. No. 09/987,733 filed on Nov. 15, 2001, which is hereby incorporated by reference in its entirety. This application claims priority to Japanese Patent Application No. 2000-350715 filed Nov. 17, 2000, which is hereby incorporated by reference in its entirety.

BACKGROUND OF THE INVENTION

1. Field of the Invention

The present invention relates to an image blur correction camera and a method for controlling of image blur correction for correcting an image blur caused by hand vibration, with an ocular viewfinder and a non-ocular viewfinder.

2. Description of Related Art

In digital still cameras and digital video cameras, it is common practice to provide an ocular viewfinder that a photographer peers into with the eye brought into close contact, in order to confirm a photographing range, etc., as well as a non-ocular viewfinder that uses a liquid crystal display or the like, in order to confirm the photographed image without the photographer bringing their eyes close to the camera. In the case of a camera provided with an ocular viewfinder and a non-ocular viewfinder, the photographer can use the camera selecting either the ocular viewfinder or the non-ocular viewfinder according to conditions or preference.

If the camera is held in the hands, there is likely to be image blur due to vibration of the hands. Blur correction cameras provided with blur correction devices are known for correcting image blur caused by hand vibration, regardless of whether the picture is a still picture or a moving picture. A blur correction camera detects shaking of a camera due to hand vibration using a vibration sensor or the like, and carries out blur correction based on detection values. In the case where a picture is taken using an ocular view finder and the case where a picture is taken using a non-ocular viewfinder, the way in which the camera is shaken by hand vibration is different. Also, in the case where a picture is taken using a non-ocular viewfinder, it is common for the photographer to hold the camera out at arm's length and camera shaking is then quite significant.

However, a conventional image blur correction camera performs the same blur correction regardless of whether the photographer is taking a picture using the ocular viewfinder or the non-ocular viewfinder. Therefore, for example, if a blur correction operation is set in correspondence with camera vibration caused by hand vibration when using the ocular viewfinder, it is likely that it will be impossible to carry out blur correction when using the non-ocular viewfinder. Also, even if image blur correction is carried out when using the non-ocular viewfinder, there are problems such that it may be performed strangely and unnaturally.

SUMMARY OF THE INVENTION

The object of the present invention is to provide an image blur correction camera that can set a blur correction operation to optimum conditions, regardless of whether a photographer is taking a picture using an ocular viewfinder or taking a picture using a non-ocular viewfinder.

In order to achieve the above object, an image blur correction camera comprises a photographing optical system, an image-capturing element that captures a subject image through said photographing optical system a vibration detection section that detects camera vibration, a blur correction section that corrects blur of the image captured by said image-capturing element according to detection results of said vibration detection section, an ocular viewfinder for observing the subject with one's eyes in close contact, a non-ocular viewfinder for observing the subject with one's eyes at a distance, a used viewfinder determination section that determines which of said ocular viewfinder and said non-ocular viewfinder is being used and a blur correction operation changing section that changes operation of said blur correction device according to determination results of said used viewfinder determination section.

It is preferable that the blur correction operation changing section suspends operation of said blur correction section in the event that said used viewfinder determination section has determined that said non-ocular viewfinder is being used.

The blur correction operation changing section may engage said blur correction section to operate, in the event that said used viewfinder determination section has determined that said non-ocular viewfinder is being used, so that a range over which the image blur correction can be carried out becomes wider than that when it is determined that said ocular viewfinder is being used.

It is preferable that said blur correction device includes an optical blur correction device that corrects image blur by moving a movement member so as to make a change in relative position between the subject image formed on said image-capturing element and said image-capturing element itself; and said blur correction operation changing section expands a operable range of said movement member so as to expand the range over which the image blur correction can be carried out, in the event that said used viewfinder determination section has determined that said non-ocular viewfinder is being used. The blur correction operation changing section may set a center bias of said movement member weakly so as to expand the range over which the image blur correction can be carried out, in the event that said used viewfinder determination section has determined that said non-ocular viewfinder is being used. It is preferable that the movement member is part of said photographing optical system.

It is possible that the blur correction device includes an electronic blur correction device that corrects image blur by subjecting image data generated by said image-capturing element to image processing; and said blur correction operation changing section engages said blur correction device to operate so that image blur correction is carried out by said electronic blur correction device if it is determined by said used viewfinder determination section that said non-ocular viewfinder is being used, while image blur correction is not carried out by said electronic blur correction device if it is determined by said used viewfinder determination section that said ocular viewfinder is being used.

It is possible that the vibration detection section has an angular velocity sensor that detects angular velocity of the camera; and said blur correction operation changing section engages said blur correction device to operate so that image blur correction is carried out based on detection results from said angular velocity sensor and image data generated by said image-capturing element when it is determined by said used viewfinder determination section that said non-ocular viewfinder is being used, while image blur correction is carried out based on detection results from said angular velocity sensor when it is determined by said used viewfinder determination section that said ocular viewfinder is being used.

It is also possible that the vibration detection sensor has an angular velocity sensor that detects angular velocity of the camera and an acceleration sensor that detects acceleration of the camera; and said blur correction operation changing section engages said blur correction device to operated so that image blur correction is carried out based on detection results of said angular velocity sensor and said acceleration sensor if it is determined by said used viewfinder determination section that said non-ocular viewfinder is being used, while image blur correction is carried out based on detection results from said angular velocity sensor if it is determined by said used viewfinder determination section that said ocular viewfinder is being used.

It is preferable to provide a low-pass filter that passes waves with frequency lower than a set cut-off frequency; and that said blur correction operation changing section switches the cut-off frequency of said low pass filter depending on the viewfinder being used determined by said used viewfinder determination section. It is preferable that the blur correction operation changing section sets the cut-off frequency of said low pass filter, when it is determined that said non-ocular viewfinder is being used, to a value that is lower than that of when it is determined that said ocular viewfinder is being used. It is preferable that the vibration detection section has an angular velocity sensor that detects angular velocity of the camera.

It is desirable that the blur correction device has an optical blur correction device that corrects image blur by moving a movement member so as to make a change in relative position between the subject image formed on said image-capturing element and said image-capturing element itself, and an electronic blur correction device that corrects image blur by subjecting image data generated by said image-capturing element to image processing; and said blur correction operation changing section engages said blur correction device to operate so that image blur correction is carried out by said optical blur correction device and said electronic blur correction device, or by said electronic blur correction device if it is determined by said used viewfinder determination section that said non-ocular viewfinder is being used, while image blur correction is carried out by said optical blur correction device if it is determined that said ocular viewfinder is being used. The vibration detection section may have an angular velocity sensor that detects angular velocity of the camera; and the optical blur correction device carries out image blur correction based on detection results of said angular velocity sensor.

In order to achieve the above object, an image blur correction camera, comprises an image-capturing element that captures a subject image through a photographing optical system; a vibration detection section that detects vibration of the camera; a blur correction signal output section that outputs blur correction signals to a blur correction device that carries out blur correction of the image formed by said image-capturing element according to detection results from said vibration detection section; an ocular viewfinder for observing the subject with one's eyes in close contact; a non-ocular viewfinder for observing the subject with one's eyes at a distance; a used viewfinder determination section that determines which of said ocular viewfinder and said non-ocular viewfinder is being used; and a blur correction operation changing section that controls said blur correction signal output section so as to output the signals for changing operation of said blur correction device depending on determination results of from said used viewfinder determination section.

It is preferable that the blur correction operation changing section controls said blur correction signal output section so as to output the signals for suspending operation of the blur correction device when it is determined by said used viewfinder determination section that said non-ocular viewfinder is being used.

It is possible that the blur correction operation changing section controls said blur correction signal output section, when it is determined by said used viewfinder determination section that said non-ocular viewfinder is being used, so as to output the signals for making a range over which the blur correction device is capable of performing image blur correction larger than that when it is determined that said ocular viewfinder is being used. It is preferable that said blur correction signal output section outputs the signals so as to change a range of movement of a movement member included in an optical blur correction device which makes a change in a relative position between the subject image formed on said image-capturing element and said image-capturing element itself for correcting image blur; and said blur correction operation changing section controls said blur correction signal output section so as to output the signals for expanding the moveable range of the movement member to increase a range over which image blur correction can be carried out when it is determined by said used viewfinder determination section that said non-ocular viewfinder is being used. It is also possible that the blur correction operation changing section controls said blur correction signal output section in order to set center bias of the movement member weakly to increase a range over which image blur correction can be carried out when it is determined by said used viewfinder determination section that said non-ocular viewfinder is being used.

It is possible to provide an electronic blur correction device that corrects image blur by subjecting image data generated by said image-capturing element to image processing; and that said blur correction operation changing section controls said blur correction signal output device so as to output the signals to said electronic blur correction device so that image blur correction is carried out by said electronic blur correction device if it is determined by said used viewfinder determination section that said non-ocular viewfinder is being used, while image blur correction is not carried out by said electronic blur correction device if it is determined that said ocular viewfinder is being used.

The vibration detection section may have an angular velocity sensor that detects angular velocity of the camera; and said blur correction operation changing section controls said blur correction signal output section so as to output the signals for image blur correction based on detection results from said angular velocity sensor and image data generated by said image-capturing element when it is determined by said used viewfinder determination section that said non-ocular viewfinder is being used, and for image blur correction based on detection results from said angular velocity sensor when it is determined that said ocular viewfinder is being used.

It is also possible that said vibration detection section has an angular velocity sensor that detects angular velocity of the camera, and an acceleration sensor that detects acceleration of the camera; and said blur correction operation changing section controls said blur correction signal output section so as to output the signals for image blur correction based on detection results from said angular velocity sensor and said acceleration sensor when it is determined by said used viewfinder determination section that said non-ocular viewfinder is being used, and for image blur correction based on detection results from said angular velocity sensor when it is determined that said ocular viewfinder is being used.

It is possible to provide a low-pass filter that passes waves with frequency lower than a set cut-off frequency; and that said blur correction operation changing section switches the cut-off frequency of said low pass filter depending on the viewfinder being used determined by said used viewfinder determination section. It is preferable that said blur correction operation changing section sets the cut-off frequency of said low pass filter, when it is determined that said non-ocular viewfinder is being used, to a value that is lower than that when it is detected that said ocular viewfinder is being used. The vibration detection section may have an angular velocity sensor that detects angular velocity of the camera.

It is also possible to provide an electronic blur correction device that corrects image blur by subjecting image data generated by said image-capturing element to image processing; and that said blur correction signal output section outputs blur correction signals to an optical blur correction device which makes a change in a relative position between the subject image formed on said image-capturing element and said image-capturing element itself using a movement member for correcting image blur, and to said electronic blur correction device; and said blur correction operation changing section controls said blur correction signal output section so as to output the signals in order to carry out image blur correction by the optical blur correction device and said electronic blur correction device, or by said electronic blur correction device if it is determined by said used viewfinder determination section that said non-ocular viewfinder is being used, and in order to carry out image blur correction by the optical blur correction device if it is determined that said ocular viewfinder is being used. It is preferable that said vibration detection section has an angular velocity sensor that detects angular velocity of the camera; and said blur correction operation changing section controls said blur correction signal output section so as to output the signals to the optical blur correction device for correcting image blur based on detection results of said angular velocity sensor.

In order to achieve the above object, a method for controlling of image blur correction controls image blur correction in accordance with a predetermined algorithm from a first algorithm and a second algorithm, according to camera vibration.

It is preferable to control image blur correction in accordance with the first algorithm if an ocular viewfinder is being used, while to control image blur correction in accordance with the second algorithm if the ocular viewfinder is not being used.

It is also preferable that the first algorithm is an algorithm for controlling so as to carry out image blur correction; and the second algorithm is an algorithm for controlling so as not to carry out image blur correction.

It is possible that the first algorithm is an algorithm for controlling so as to carry out image blur correction; and the second algorithm is an algorithm for controlling so as to carry out image blur correction making a range over which image blur correction can be performed wider than that of image blur correction using the first algorithm.

It is also possible that the first algorithm is an algorithm for controlling so as to carry out optical blur correction; and the second algorithm is an algorithm for controlling so as to carry out electronic blur correction.

DESCRIPTION OF THE PREFERRED EMBODIMENTS

First Embodiment

A blur correction camera of a first embodiment of the present invention will now be described in detail with reference to FIG. 1 to FIG. 3. In the first embodiment, description will be given for the case of applying the present invention to a digital camera carrying out mainly still photography.

Figure 1:
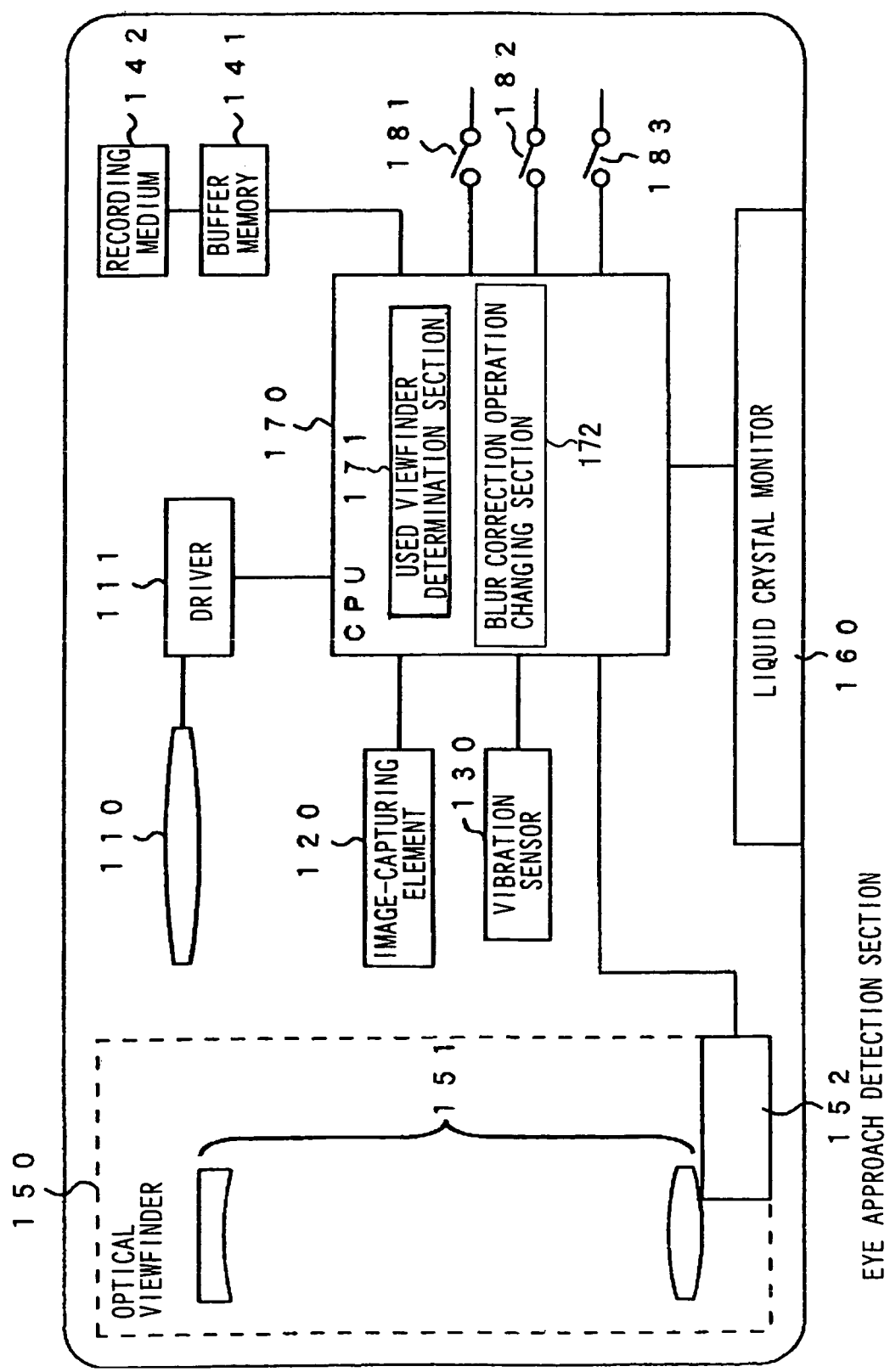
FIG. 1 is a block diagram showing the outline of a blur correction camera of a first embodiment of the present invention.

FIG. 1 is a block diagram showing the outline of a blur correction camera of the first embodiment of the present invention. As shown in FIG. 1, the blur correction camera of the first embodiment comprises a blur correction lens 110, a driver 111, an image-capturing element 120, a vibration detection sensor 130, a storage section 141, a recording medium 142, an optical viewfinder 150 constituted of a viewfinder optical system 151 and an eye-approach detection section 152, a liquid crystal monitor 160 and a CPU 170. The blur correction camera also comprises a monitor switch 181, a half-way push down switch 182 and an all-the-way push down switch 183.

The blur correction lens 110 is part of a photographing optical system (not shown), and is constituted of a single lens or a plurality of lenses capable of moving in a horizontal plane substantially orthogonal to an optical axis. The blur correction lens 110 is driven by the driver 111 so as to move in a direction substantially orthogonal to the optical axis, and causes deflection of an optical axis of the photographing optical system. The blur correction lens 110 performs blur correction by making a change in relative position between a subject image formed on the image-capturing element 120, which will be described later, and the image-capturing element 120.

The driver 111 drives the blur correction lens 110 based on a drive signal transmitted from the CPU 170, which will be described later. The driver 111 has an actuator (not shown) for driving the blur correction lens 110, and a position detection sensor (not shown) for detecting the position of the blur correction lens 110. The position of the blur correction lens 110 detected by the position detection sensor is sent to the CPU 170.

Two drivers 111 are provided for two directions that are orthogonal to each other in order to drive the blur correction lens 110 in two dimensional directions, namely in the plane substantially orthogonal to the optical axis. Here, only a driver for one direction has been shown, for simplification.

The image-capturing element 120 captures an image of the subject that has passed through the photographing optical system including the blur correction lens 110, and the captured image is output as an electrical signal. The image of the subject generated by the image-capturing element 120 is sent to the CPU 170. The image-capturing element 120 is comprised of a CCD or the like.

The vibration sensor 130 detects vibration of the blur correction camera caused by hand vibration of the photographer. In the first embodiment, angular velocity of the camera is detected by an angular velocity sensor as vibration of the camera caused by hand movement. The vibration sensor 130 is comprised of angular velocity sensors for detecting angular velocity of the camera with two directions each orthogonal to the optical axis as centers.

A buffer memory 141 temporarily stores finally obtained image data. The image data stored in the buffer memory 141 are recorded in the recording medium 142 based on instruction signals from the CPU 170.

The recording medium 142 is constituted of a non-volatile memory, disk media, tape media, or the like, and is removably fitted to the camera. The removed recording medium 142 can be connected to a computer etc. and the image may be edited on the computer.

The optical viewfinder 150 is a so-called ocular viewfinder, for a photographer to optically confirm the photographing range and the like by looking closely into an eyepiece section, not shown. The optical viewfinder 150 has a viewfinder optical system 151 and an eye approach detection section 152.

The viewfinder optical system 151 is a separate optical system independent from the photographing optical system including the blur correction lens 110. The viewfinder optical system 151 operates in conjunction with a zooming operation of a photographing lens (not shown), and the viewfinder optical system is constructed so that it is possible to observe substantially the same range as the range of the subject image projected onto the image-capturing element 120 by the photographing optical system, through the eyepiece section.

The eye approach detection section 152 is provided for determining whether or not the photographer is using the optical viewfinder 150. The eye approach detection section 152 of this embodiment is provided with, for example, an infrared-emitting diode for irradiating infrared light onto a photographer's eyeball, and an area sensor. The eye approach detection section 152 detects a central point of a photographer's pupil and a central point of a corneal reflex point, and detects the photographer's line of sight based on the detected pupil central point and the central point of corneal reflex point.

The liquid crystal monitor 160 displays the subject image that has been captured by the image-capturing element 120. The liquid crystal monitor 160 is a so-called non-ocular viewfinder that enables monitoring of the subject image without the photographer having to bring his eyes into close contact with the eyepiece section.

The CPU 170 controls the operation of the blur correction camera of this embodiment. The driver 111, image-capturing element 120, vibration sensor 130, storage section 141, eye approach detection section 152, liquid crystal monitor 160, monitor switch 181, half-way push down switch 182 and all-the-way push down switch 183 are electrically connected to the CPU 170. The CPU 170 integrates camera angular velocity signals detected by the vibration sensor 130 so as to convert them into relative angle signals. The CPU 170 then drives the driver 111 based on the obtained relative angle signals. The blur correction lens 110 is moved by the drive of the driver 111 so as to carry out a blur correction operation. It is to be noted that detection of camera angular velocity by the vibration sensor 130 and driving of the blur correction lens 110 are both carried out along two directions each substantially orthogonal to the optical axis.

The CPU 170 executes control programs functioning as a used viewfinder determination section 171 and a blur correcting operation alteration section 172.

The used viewfinder determination section 171 determines whether the photographer is using the optical viewfinder 150 or the liquid crystal monitor 160. In this embodiment, the viewfinder being used is determined based on detection results of the eye approach detection section 152 described above. That is, if it is detected by the eye approach detection section 152 that the photographer is looking into the eyepiece section of the optical viewfinder 150, it is judged that the optical viewfinder 150 is being used. On the other hand, if it is not detected by the eye approach detection section 152 that the photographer is looking into the eyepiece section, it is judged that the liquid crystal monitor 160 is being used.

The blur correcting operation alteration section 172 changes the operation of the blur correction lens 110 in accordance with the viewfinder being used detected by the used viewfinder determination section 171. Operation of the blur correction lens 110 according to the viewfinder used will be described later.

The monitor switch 181 is operated by the photographer. If the monitor switch 181 is turned on, the liquid crystal monitor 160 is put into a display state, and if the monitor switch 181 is turned off, the liquid crystal monitor 160 is switched to a non-display state.

The half-way push down switch 182 is turned on in response to a half-way pressing operation of a shutter release button (not shown). When receiving an on-signal from the half-way push down switch 182, the CPU 170 sends an instruction signal for starting a photographing preparation operation to a photometry section (not shown) and an auto focus section (also not shown) etc. A sequence of photography preparations such as photometry calculations in the photometry section, and auto focus operation in the auto focus section etc. are commenced.

The all-the-way push down switch 183 is turned on in response to a further full push down operation of the shutter release button from the half-way push down state. When receiving an on-signal from the all-the-way push down switch 183, the CPU 170 outputs an instruction signal so as to execute a sequence of photographing operations. For example, the CPU 170 takes in an image data captured by the image-capturing element 120, and temporarily stores the image data in the buffer memory 141. Then the CPU 170 records the image data stored in the buffer memory 141 into the recording medium 142.

The used viewfinder determination section 171 of this embodiment judges that the optical viewfinder 150 is being used in the event that the eye approach detection section 152 detects the approach of the eyes, even if the liquid crystal monitor 160 is in a display state with the monitor switch 181 on. Also, in the event that the eye approach detection section 152 does not detect the eyes approaching, while at the same time the liquid crystal monitor 160 is in a non-display state with the monitor switch 181 off, the used viewfinder detection section judges that it is in a no-viewfinder state where the photographer is not using either of the viewfinders, and determines that the liquid crystal monitor 160 is being used.

It is also possible to determine which viewfinder is used based on the on/off state of the monitor switch 181, that is, based on the display state of the liquid crystal monitor 160. In this case, the eye approach detection section 152 can be omitted.

The blur correction camera of this embodiment is provided with the optical viewfinder 150 and the liquid crystal monitor 160, as described above. The photographer can select which viewfinder to use according to their preference. However, the amount of vibration of the camera and the way in which it is shaken due to hand vibration, is different depending on which viewfinder the photographer uses when taking pictures. The blur correction camera of the present invention changes the method of correcting image blur caused by unsteady hand movement depending on the viewfinder in use.

Figure 2A:
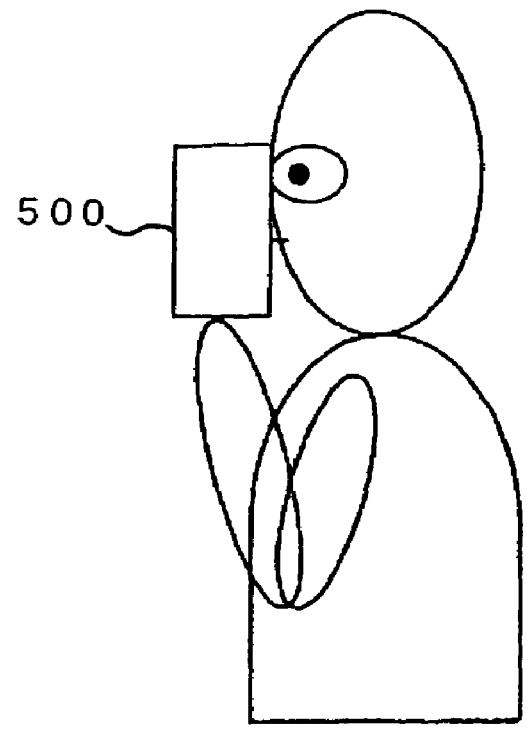
FIG. 2A is a drawing showing a photographing posture in the case of a photographer using an ocular viewfinder.
Figure 2B:
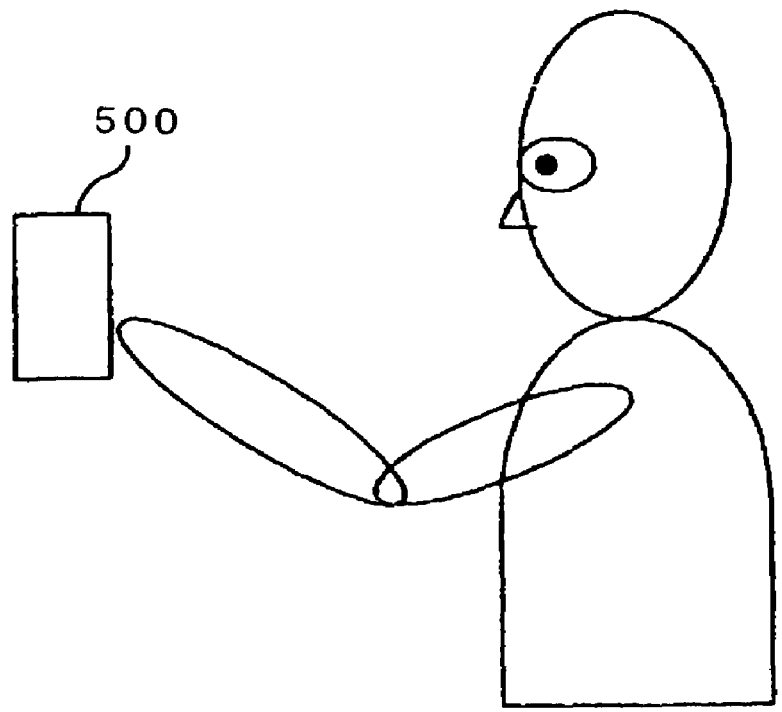
FIG. 2B is a drawing showing a photographing posture in the case of a photographer using a liquid crystal monitor.
Figure 3:
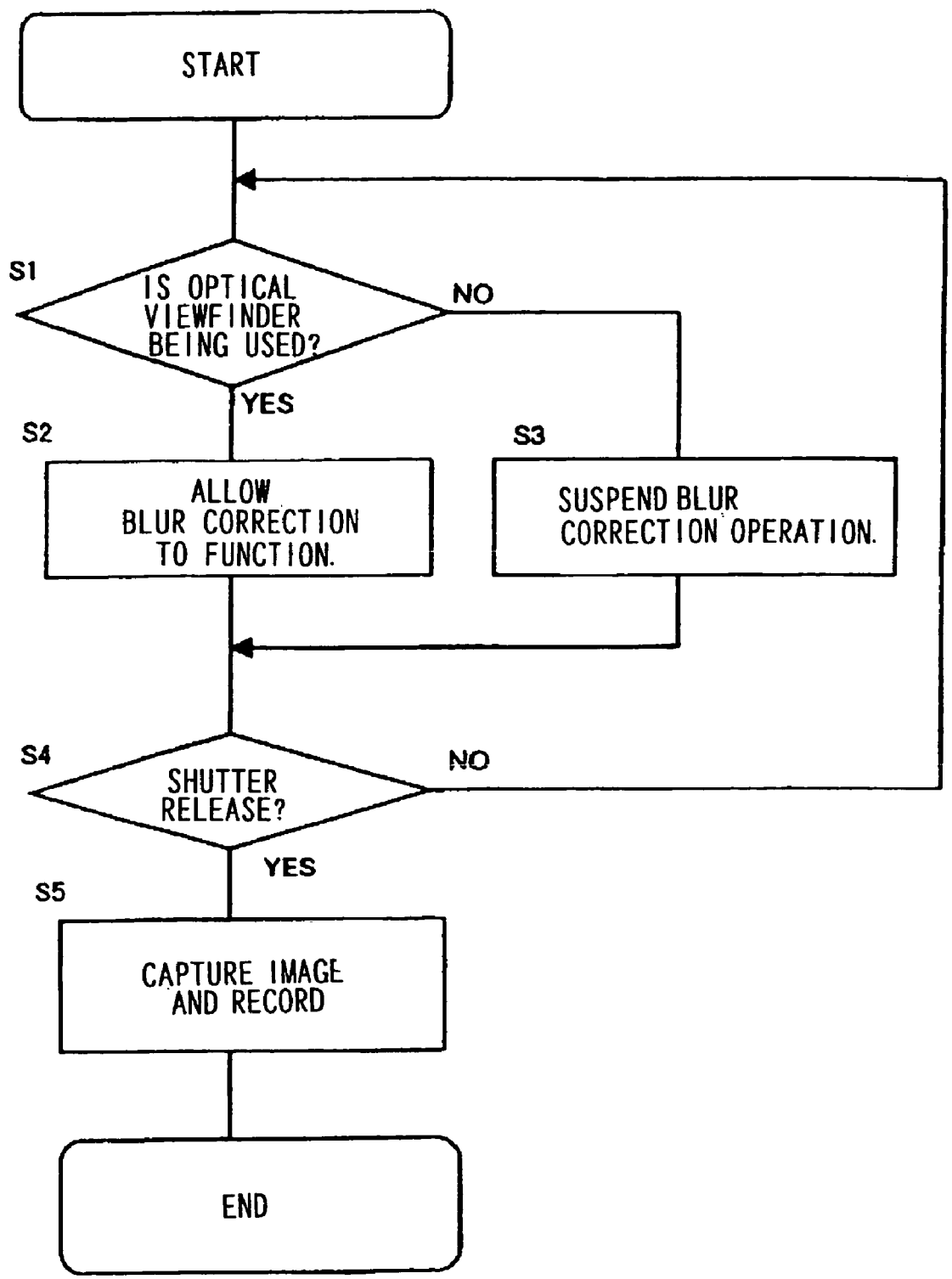
FIG. 3 is flowchart showing a processing procedure for blur correction operation control by a CPU of the first embodiment.

FIG. 2A and FIG. 2B show a photographer using the blur correction camera 500 of this embodiment. FIG. 2A shows a photographing posture in the case of a photographer using the optical viewfinder 150, and FIG. 2B shows a photographing posture in the case of a photographer using the liquid crystal monitor 160.

As shown in FIG. 2A, if the optical viewfinder 150 is being used, the photographer uses the camera with their eyes close to the eyepiece section of the optical view finder. As a result, the photographer's face is almost touching the camera. Also, the photographer's elbows are tucked in to the side, which means that camera vibration due to unsteady hand movement is slight and the image blur hardly occurs. Accordingly, if the blur correction lens 110 is engaged in moving to perform blur correction, it is possible to obtain a high quality image without worrying about image vibration at all.

On the other hand, as shown in FIG. 2B, in the case of using the liquid crystal monitor 160, the photographer's face does not touch the camera. The photographer's face is at a distance from the camera, and his elbows are often extended. This means that compared to the case where the optical viewfinder 150 is used, the way in which the camera vibrates due to unsteady hand movement is different, and also, the amount of camera vibration is large and it is likely that unexpected vibration will occur. Further, if the photographer applies excess force in order to suppress the camera vibration, the vibration will in fact be more likely to arise. There is a limit to the amount of image blur, namely the amount of vibration of the camera, for which blur correction can be carried out by the blur correction lens 110. In the event that an extremely large amount of camera vibration occurs, it is not possible to carry out sufficient blur correction with only the blur correction lens 110. Specifically, even if the photographer intended to carry out blur correction, the acquired image will contain the image blur.

In the first embodiment of the present invention, a blur correction operation is carried out using the blur correction lens 110 when the photographer is using the optical viewfinder 150. On the other hand, if the photographer is not using the optical viewfinder 150, that is, the photographer is using the liquid crystal monitor 160, the blur correction operation using the blur correction lens 110 is not performed.

The operation of the blur correction camera of the first embodiment will now be described below. FIG. 3 is a flowchart showing a processing procedure for a photographing operation and blur correction operation control executed by the CPU 170. This processing is started by turning the half-way push down switch 182 on.

In step S1, it is judged as to whether or not the optical viewfinder 150 is being used based on detection results of the eye approach detection section 152 at the used viewfinder determination section 171. If it is judged in step S1 that the optical viewfinder 150 is being used, processing advances to step S2.

In step S2, the blur correcting operation alteration section 172 sends a signal to the driver 111 so as to carry out a blur correction operation using the blur correction lens 110. At this time, the blur correction lens 110 carries out a blur correction operation based on detection results of the vibration sensor 130.

On the other hand, if it is judged in step S1 that the optical viewfinder 150 is not being used, that is, that the liquid crystal monitor 160 is being used, processing proceeds to step S3.

In step S3, the blur correcting operation alteration section 172 sends a signal to the driver 111 so that the blur correction operation using the blur correction lens 110 is not carried out. However, it keeps detecting the angular velocity of the camera using the vibration sensor 130.

Continuing on, in step S4, it is judged as to whether or not the shutter release button has been pressed, namely, whether or not the all-the-way push down switch 183 has been turned on. If it is judged that the all-the-way push down switch 183 has been turned on by pressing the shutter release button, processing proceeds to step S5. On the other hand, if it is judged in step S4 that the shutter release button has not been pressed, namely, that the all-the-way push down switch 183 is off, processing returns to step S1.

In step S5, capturing the subject image is carried out by the image-capturing element 120. The captured image data is recorded in the recording medium 142, and the sequence of operations is terminated.

As described above, the blur correction camera of the first embodiment of the present invention performs image blur correction using a blur correction lens when the optical viewfinder is being used. Also, image blur correction using a blur correction lens is not carried out when the optical viewfinder is not being used, that is, when the liquid crystal monitor is being used. In this way, it is possible to reduce the phenomenon where image blur occurs in an acquired image even if blur correction is performed, that arises particularly in the case of taking a photograph using the liquid crystal monitor, and it is possible to carry out optimum control according to the usage state of the viewfinder.

Second Embodiment

A blur correction camera of a second embodiment is constructed so that the extent of movement of the blur correction lens 110 becomes large compared to the first embodiment, and the range over which blur correction can be performed is increased. The outline of a blur correction camera of the second embodiment is the same as the first embodiment shown in FIG. 1. Description here will mainly focus on points of difference from the first embodiment.

The blur correction lens 110 is part of a photographing optical system (not shown), as in the first embodiment, and is constituted of a single lens or a plurality of lenses that are capable of movement in a plane substantially orthogonal to the optical axis. The blur correction lens 110 of the second embodiment is constructed so as to be capable of movement over a wider range than that in the first embodiment. In this way, it is possible to carry out correction of image blur caused by comparatively large hand movement in the case of using the liquid crystal monitor 160.

The blur correcting operation alteration section 172 of the CPU 170 alters the movement range of the blur correction lens 110 according to the viewfinder that the photographer is using. When the optical viewfinder 150 is being used, camera vibration due to unsteady hand movement is comparatively small, and so the operable range of the blur correction lens 110 is set to narrow (operating mode 1). If the optical viewfinder 150 is not being used, that is, if the liquid crystal monitor 160 is being used, the operable range of the blur correction lens 110 is set wide (operating mode 2) so as to be able to handle a large amount of camera vibration due to unsteady hand movement.

Operating mode 1 set when the optical viewfinder 150 is used, narrowly restricts the operable range of the blur correction lens 110, which means that the range (size) of hand movement that the blur correction lens 110 can cope with becomes small. However, since it is possible to carry out high precision blur correction in a narrow range, it is possible to improve the quality of the acquired image.

Operating mode 2 set when the liquid crystal monitor 160 is used, can make the range of hand movement that can be handled by the blur correction lens 110 larger, instead of lowering the precision of blur correction to a particular level.

Figure 4:
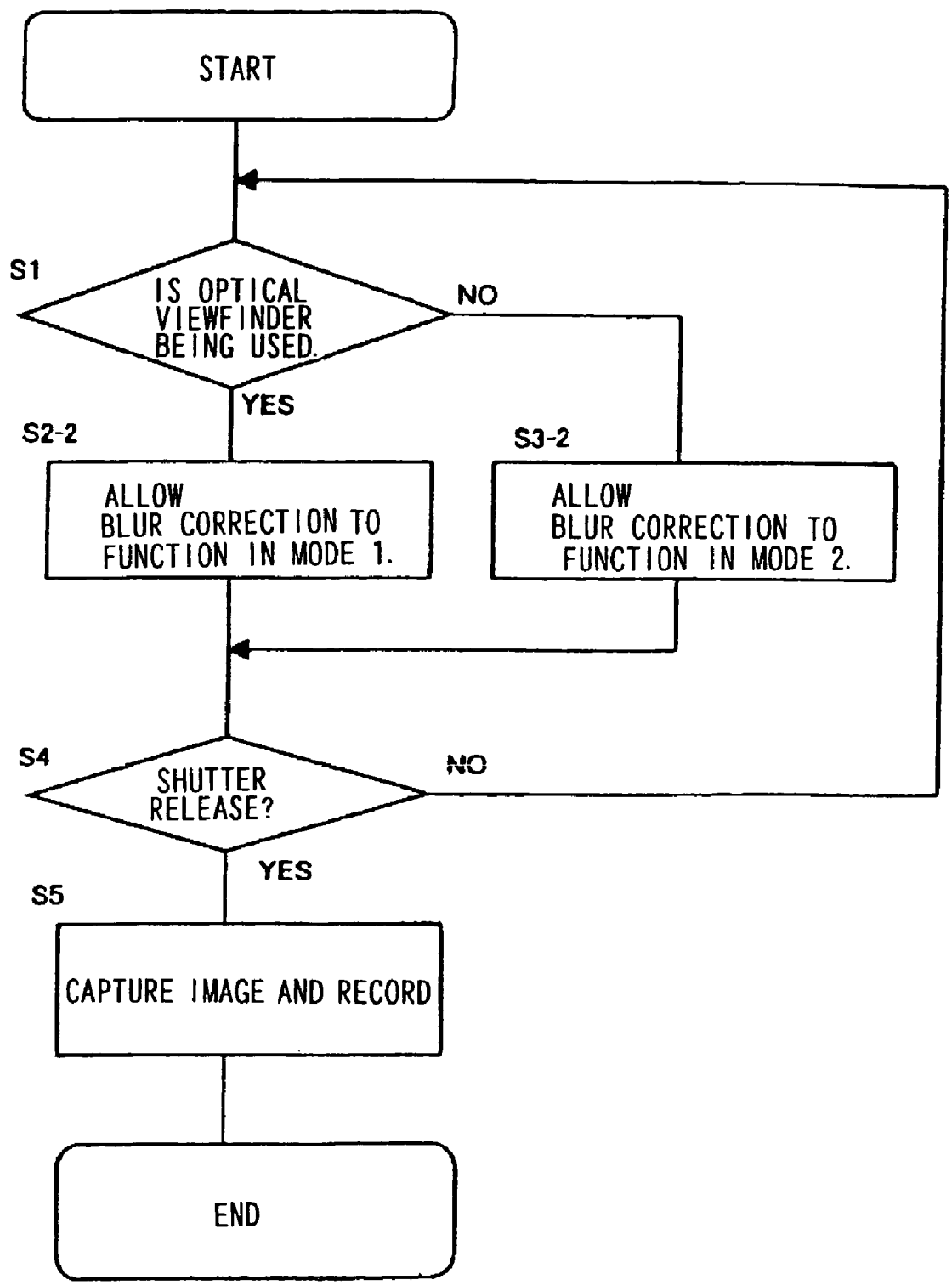
FIG. 4 is flowchart showing a processing procedure for blur correction operation control by a CPU of a second embodiment.

The operation of the blur correction camera of the second embodiment will now be described below. FIG. 4 is a flowchart showing a processing procedure for a photographing operation and blur correction operation control executed by the CPU 170. This processing is started by turning the half-way push down switch 182 on.

In step S1, it is judged as to whether or not the optical viewfinder 150 is being used based on detection results of the eye approach detection section 152 at the used viewfinder determination section 171. If the affirmative judgement is made in step S1 that the optical viewfinder 150 is being used, processing advances to step S2-2.

In step S2-2, the blur correcting operation alteration section 172 sends a signal to the driver 111 so that the blur correction lens 110 carries out a blur correction operation in operating mode 1.

On the other hand, if it is judged in step S1 that the optical viewfinder 150 is not being used, that is, that the liquid crystal monitor 160 is being used, processing proceeds to step S3-2.

In step S3-2, the blur correcting operation alteration section 172 sends a signal to the driver 111 so that the blur correction lens 110 carries out a blur correction operation in operating mode 2.

Continuing on, step S4 and step S5 are the same as in the first embodiment described above, and so descriptions of these steps are omitted.

As described above, the blur correction camera of the second embodiment of the present invention performs blur correction with a narrow operable range of the blur correction lens when the optical viewfinder is being used. Also, blur correction is carried out with a wide operable range of the blur correction lens when the optical viewfinder is not being used, namely, when the liquid crystal monitor is being used. In this way, it is possible to carry out blur correction according to the viewfinder used. Also, by setting the operable range of the blur correction lens narrow when the optical viewfinder is being used, it is possible to carry out blur correction with the blur correction lens controlled with high precision, and it is possible to acquire a higher quality image.

A modified example of the second embodiment will now be described in the following.

With the blur correction camera, when blur correction is carried out using the blur correction lens 110, a bias towards center may be set in the driver 111 in order to prevent the blur correction lens 110 moving up to the physical limit of movement and colliding. With the modified example of the second embodiment, the bias towards center is set in the driver 111, and control is performed so that the centripetal force by which the blur correction lens 110 is moved towards the center becomes stronger as the blur correction lens 110 is moved farther away from the center of the operable range,.

In the modified example of the second embodiment, the strength of the center bias set in the driver 111 is altered by the blur correction alteration section 172 according to the viewfinder used. Depending on whether the center bias is set strongly or weakly, it is possible to change the substantial range over which the blur correction lens 110 can be moved.

Figure 5:
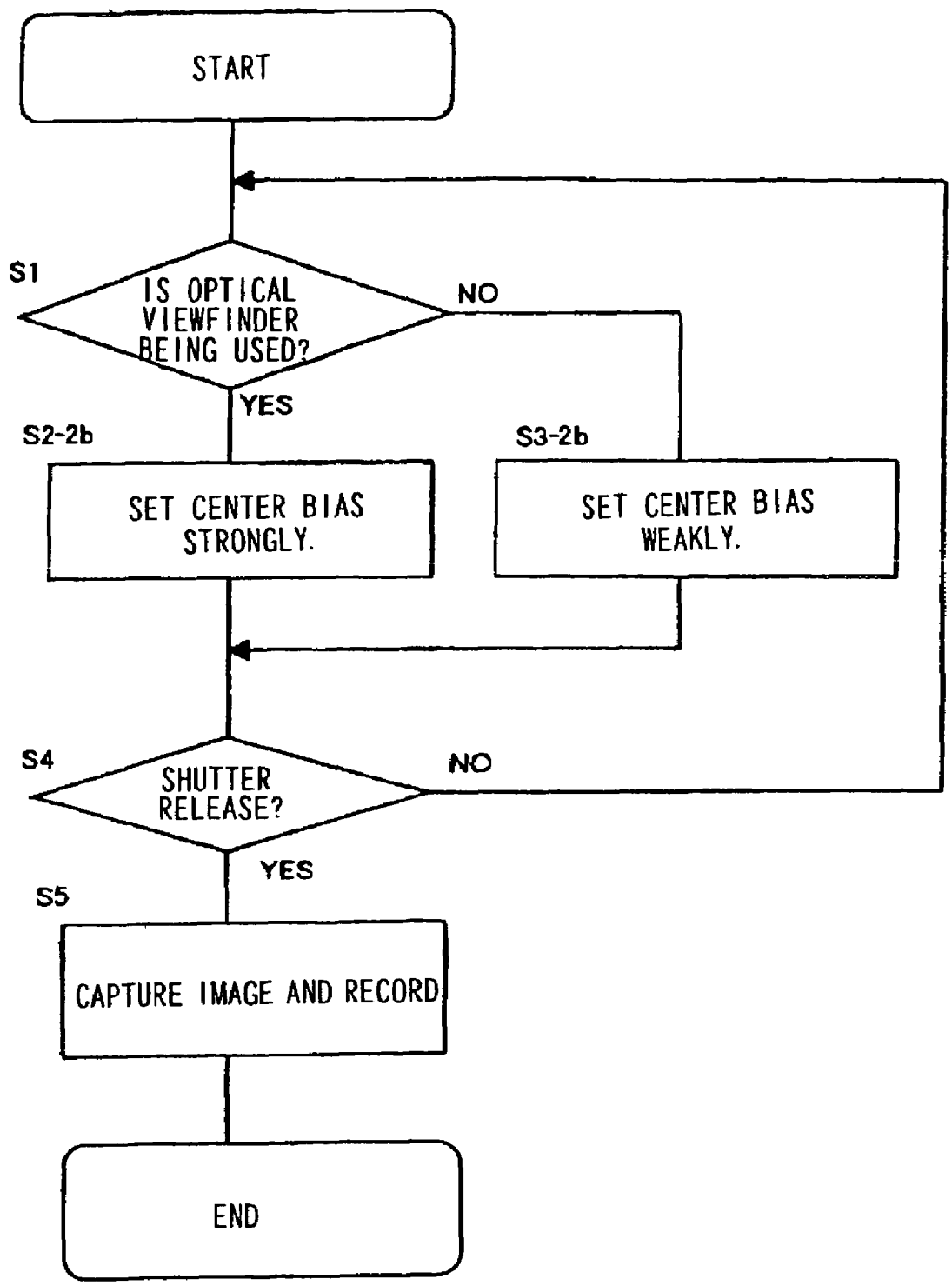
FIG. 5 is flowchart showing a processing procedure for blur correction operation control by a CPU of a modified example of the second embodiment.

FIG. 5 is a flowchart showing a processing procedure for a photographing operation and blur correction operation control executed by the CPU 170 in a modified example of the second embodiment. This processing is started by turning the half-way push down switch 182 on.

In step S1, it is judged as to whether or not the optical viewfinder 150 is being used based on detection results of the eye approach detection section 152 at the used viewfinder determination section 171. If it is judged in step S1 that the optical viewfinder 150 is being used, processing advances to step S2-2b.

In step S2-2b, the blur correction operation changing section 172 sends a signal to the driver 111 so that the center bias is strongly set. If the center bias is set strongly, the effective operable range of the blur correction lens 110, namely the range over which blur correction can be carried out, becomes narrow.

On the other hand, if it is judged in step S1 that the optical viewfinder 150 is not being used, that is, that the liquid crystal monitor 160 is being used, processing proceeds to step S3-2b.

In step S3-2b, the blur correction operation changing section 172 sends a signal to the driver 111 so that the center bias is weakly set. If the center bias is set weakly, the effective operable range of the blur correction lens 110, that is the range over which blur correction can be performed, becomes widened.

Next, step S4 and step S5 are the same as in the above described first embodiment, and their descriptions are omitted.

As has been described above, the modified example of the second embodiment obtains the same effects as the above described second embodiment.

The strength of the center bias is set as to allow movement of the blur correction lens so that blur correction in the case of using the optical viewfinder can be carried out with high precision, as well as making it possible to perform blur correction for camera vibration caused by unsteady hand movement in the event that the liquid crystal monitor is used.

Third Embodiment

In the third embodiment, a description will be given of the case where the blur correction camera of the present invention is applied to a video camera for taking moving pictures.

Figure 6:
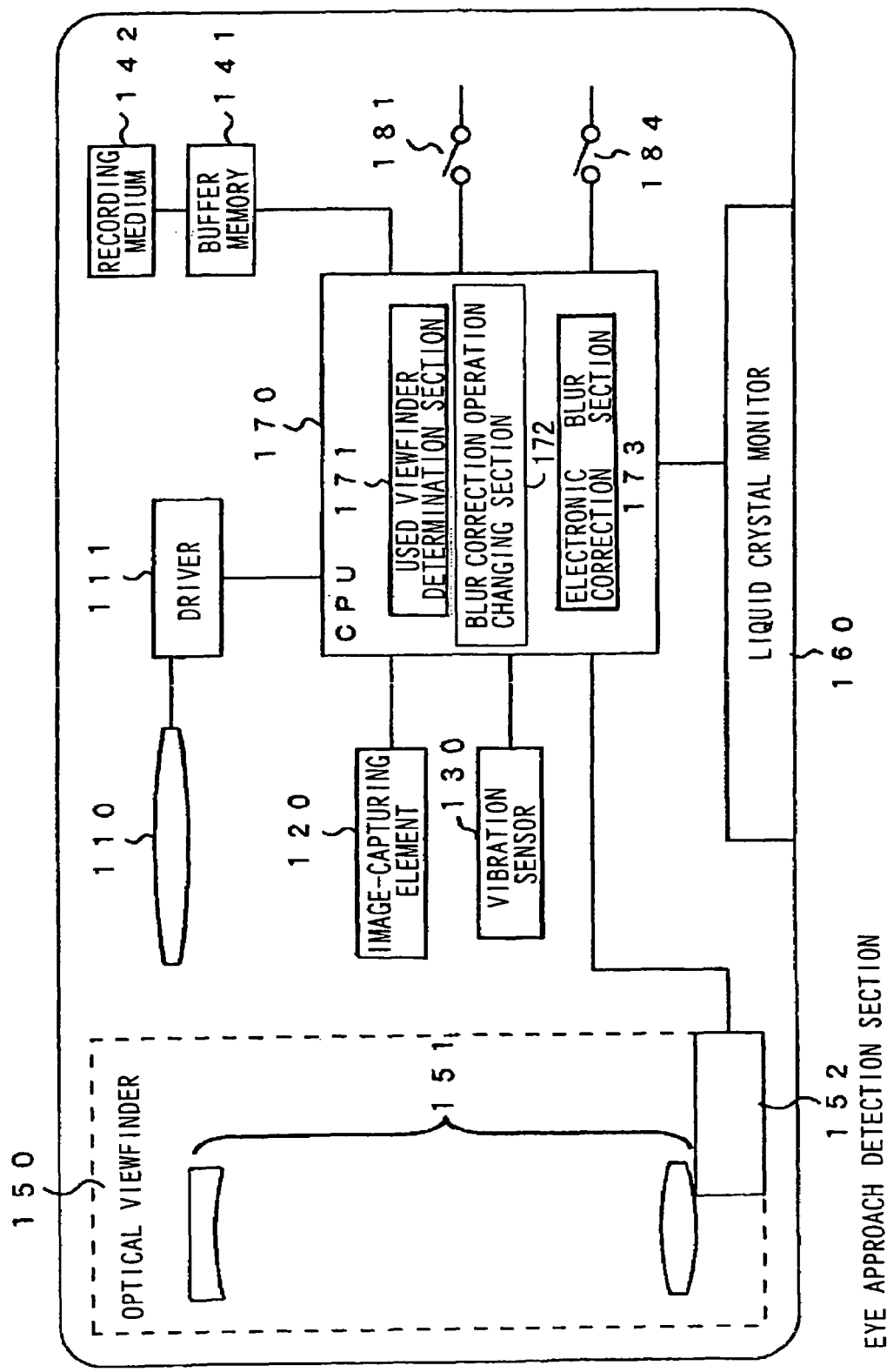
FIG. 6 is a block diagram showing the outline of a blur correction camera of a third embodiment.

FIG. 6 is a block diagram showing the outline of a blur correction camera of the third embodiment of the present invention. As shown in FIG. 6, the CPU 170 of the blur correction camera of the third embodiment also executes a control program that functions as an electronic blur correction section 173. A recording start switch 184 is provided instead of the half-way push down switch 182 and the all-the-way push down switch 183. Sections that are common to the first embodiment have the same reference numerals attached thereto, and their descriptions are omitted.

The electronic blur correction section 173 performs image blur correction for an image to be recorded by outputting an image formed on the image-capturing element 120 with a displacement in a direction opposite to the direction of the vibration based on the amount of vibration of the camera. The operating contents of the electronic blur correction section 173 will now be described using FIGS. 7A and 7B.

Figure 7A:
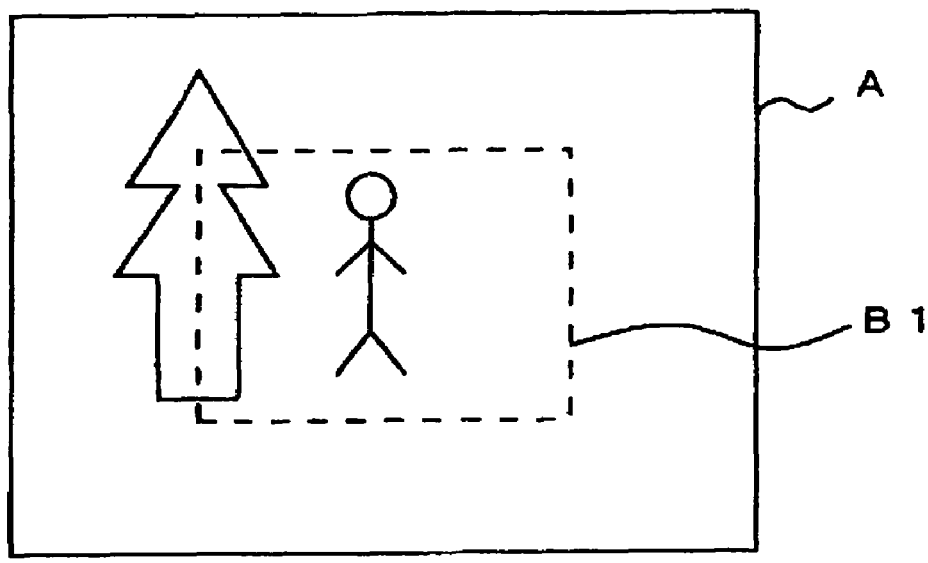
FIG. 7A is a drawing for describing the contents of operation at an electronic blur correction section.
Figure 7B:
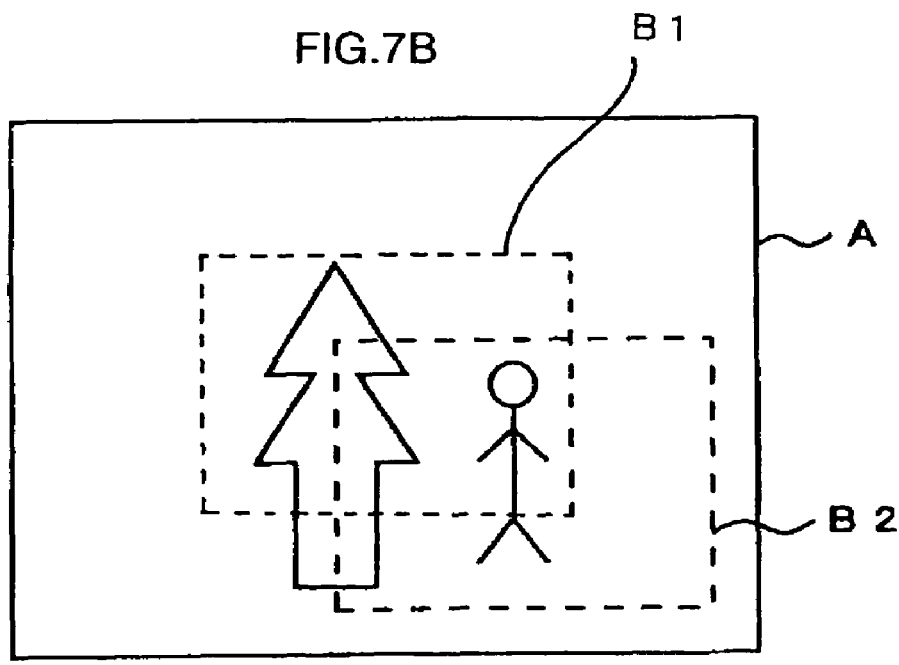
FIG. 7B is a drawing for describing the contents of operation at the electronic blur correction section.

As shown in FIG. 7A, the electronic blur correction section 173 uses part of the imageable region A of the image-capturing element 120 as an output region B1. That is, the output region B1 being part of the imageable region A, is shown on the liquid crystal monitor 160, and recorded in the recording medium 142. When the subject image formed on the imageable region A of the image-capturing element 120 is shifted due to hand vibration, as shown in FIG. 7B, the electronic blur correction section 173 shifts the output region from B1 to B2 in correspondence with the vibration. The electronic blur correction section 173 compares output values for each pixel output from the image-capturing element 120 with previous output values, and detects at what position of the imageable region A the subject image exists. That is, the electronic blur correction section 173 analyzes movement of the subject image formed on the image-capturing element 120 to detect camera vibration, and causes shifting of the output region so as to follow the movement of the subject image. The method for shifting the output region so as to follow the movement of the subject image is well known, and detailed description will be omitted. In this way, the displacement of the subject image caused by unsteady hand movement is not represented on the output image.

As described above, when electronic blur correction is carried out by the electronic blur correction section 173, only an output region B which is a part of the imageable region A of the image-capturing element 120, is output. As a result, the overall number of pixels of the obtained image is reduced, and image quality deteriorates. In the third embodiment, the electronic blur correction by the electronic blur correction section 173 is only performed in the case where photographing is carried out without the photographer using the optical viewfinder 150. In this case, optical blur correction using the blur correction lens 110 is not performed.

If the optical viewfinder 150 is not being used, that is, if the liquid crystal monitor 160 is being used, it can be considered that the shift vibration caused by the camera movement parallel to the optical axis will occur, as well as the rotational vibration of the camera due to hand vibration. The electronic blur correction section 173 performs correction for the image blur caused by rotational vibration and shift vibration by analyzing image signals generated by the image-capturing element 120 and carrying out image processing.

On the other hand, in the event that the optical viewfinder 150 is being used, since there is partial contact between the photographer's face and the camera, rotational vibration of the camera due to hand vibration occurs. Angular velocity of the camera is detected by the angular velocity sensor 130, and optical blur correction is performed using the blur correction lens 110 based on the detected angular velocity of the camera.

Photographing operation with the blur correction camera is started by turning the recording switch 184 on.

Figure 8:
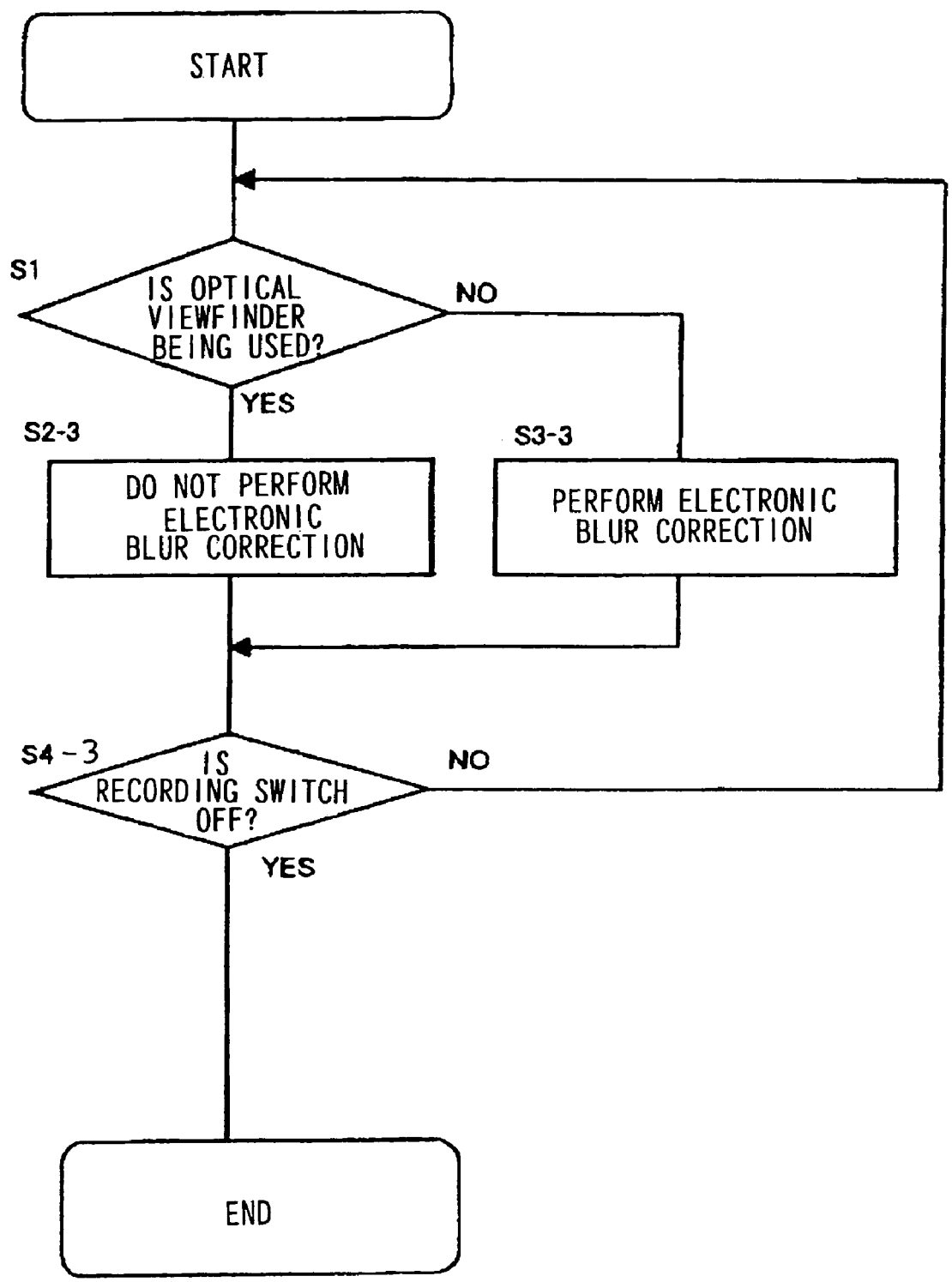
FIG. 8 is flowchart showing a processing procedure for blur correction operation control by a CPU of the third embodiment.

FIG. 8 is a flowchart showing a processing procedure for a photographing operation and blur correction operation control executed by the CPU 170 in the third embodiment. In response to the recording switch 184 turned on, photographing and recording operation on the blur correction camera are started, and the blur correction operation control process is started.

In step S1, it is judged as to whether or not the optical viewfinder 150 is being used based on detection results from the eye approach detection section 152 at the used viewfinder determination section 171. If the affirmative judgement is made in step S1 that the optical viewfinder 150 is being used, processing advances to step S2-3.

In step S2-3, the blur correction operation changing section 172 sends a signal to the electronic blur correction section 173 so that electronic blur correction is not carried out. If the optical viewfinder 150 is being used, only optical blur correction using the blur correction lens 110 is performed, without carrying out electronic blur correction by the electronic blur correction section 173.

On the other hand, if it is judged in step S1 that the optical viewfinder 150 is not being used, processing proceeds to step S3-3.

In step S3-3, the blur correction operation changing section 172 sends a signal to the electronic blur correction section 173 so as to carry out electronic blur correction. At this time, optical blur correction by the blur correction lens 110 is not carried out. It is to be noted that when taking a photograph without using the optical viewfinder 150, the output region B that is a part of the imageable region shown in FIGS. 7A and 7B is displayed on the liquid crystal monitor 160, and recorded in the recording medium 142.

In step S4-3, it is judged as to whether or not the recording switch 184 is turned off. If the affirmative judgement is made in step S4-3 that the recording switch 184 is turned off, this process is terminated.

As described above, the blur correction camera of the third embodiment of the present invention does not perform electronic blur correction by the electronic blur correction section when the optical viewfinder is being used. When the optical viewfinder is being used, it is possible to acquire a high quality image by carrying out optical blur correction using the blur correction lens.

When the optical viewfinder is not being used, the extent of camera vibration is comparatively large, and shift vibration of the camera also occurs, and it is possible that sufficient blur correction will not be carried out by the optical blur correction using the blur correction lens. By carrying out electronic blur correction on the electronic blur correction section, it is possible to correct image blur that can not be corrected by the blur correction lens.

Fourth Embodiment

Figure 9:
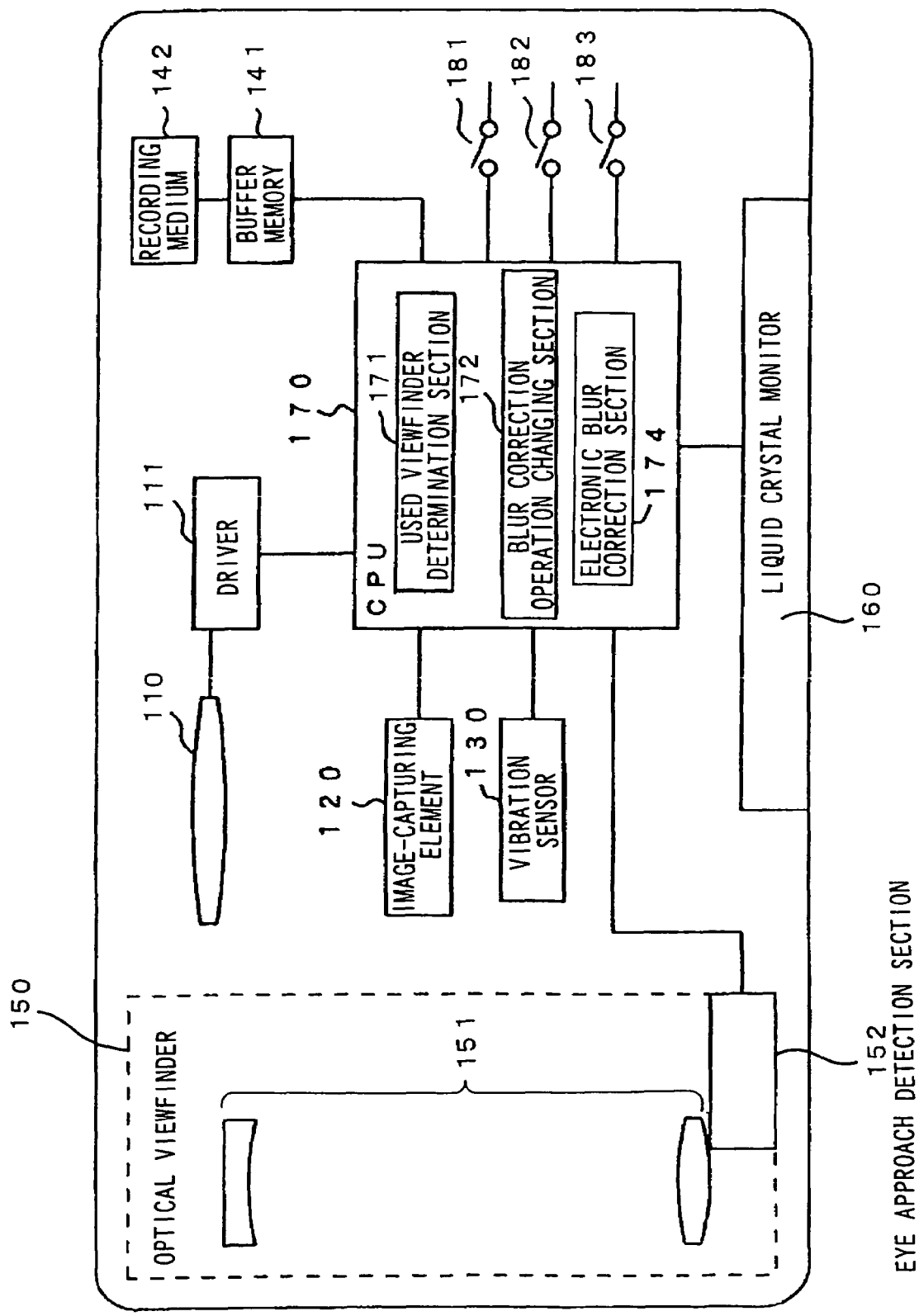
FIG. 9 is a block diagram showing the outline of a blur correction camera of a fourth embodiment.

FIG. 9 is a block diagram showing the outline of a blur correction camera of the fourth embodiment of the present invention. In the fourth embodiment, a blur correction camera of the present invention is applied to a digital still camera, as with the first embodiment. As shown in FIG. 9, the CPU 170 of the blur correction camera of the fourth embodiment also executes a control program that functions as an electronic blur correction section 174. Sections that are common to the first embodiment have the same reference numerals attached thereto, and their descriptions are omitted.

The electronic blur correction section 174 performs image blur correction by analyzing image signals generated by the image-capturing element 120 to detect camera vibration and carry out image processing, similarly to the electronic blur correction section 173 of the third embodiment. In the electronic blur correction section 174 of the fourth embodiment, image blur correction is performed using a combination of electronic blur correction by the electronic blur correction section 174 and optical blur correction using the blur correction lens 110.

The CPU 170 detects rotational vibration of the camera based on the angular velocity of the camera detected by the angular velocity sensor 130. In response to the rotational vibration of the camera, optical blur correction is carried out using the blur correction lens 110. In image data generated by the image-capturing element 120, correction of the image blur attributable to the rotational vibration has been carried out using the blur correction lens 110, however correction of the image blur attributable to the shift vibration is not carried out yet. The electronic blur correction section 174 then analyzes image signals generated by the image-capturing element 120, and carries out image processing so as to electronically correct image blur caused by shift vibration. In this way, image blur due to rotational vibration caused by hand vibration, and image blur due to vibration where the camera moves parallel along two directions each orthogonal to the optical axis, namely shift vibration, can be reliably corrected.

If the optical viewfinder 150 is being used, a large portion of the vibration of the camera attributable to unsteady hand movement is caused by rotation of the camera. Therefore, the angular velocity of the camera is detected by the angular velocity sensor 130 and optical blur correction is performed using the blur correction lens 110.

On the other hand, if the optical viewfinder 150 is not being used, that is, if the liquid crystal monitor 160 is being used, it can be considered that shift vibration will occur as well as rotational vibration of the camera attributable to hand vibration. Then, as well as optical blur correction using the blur correction lens 110, electronic blur correction by the electronic blur correction section 174 is also performed.

Figure 10:
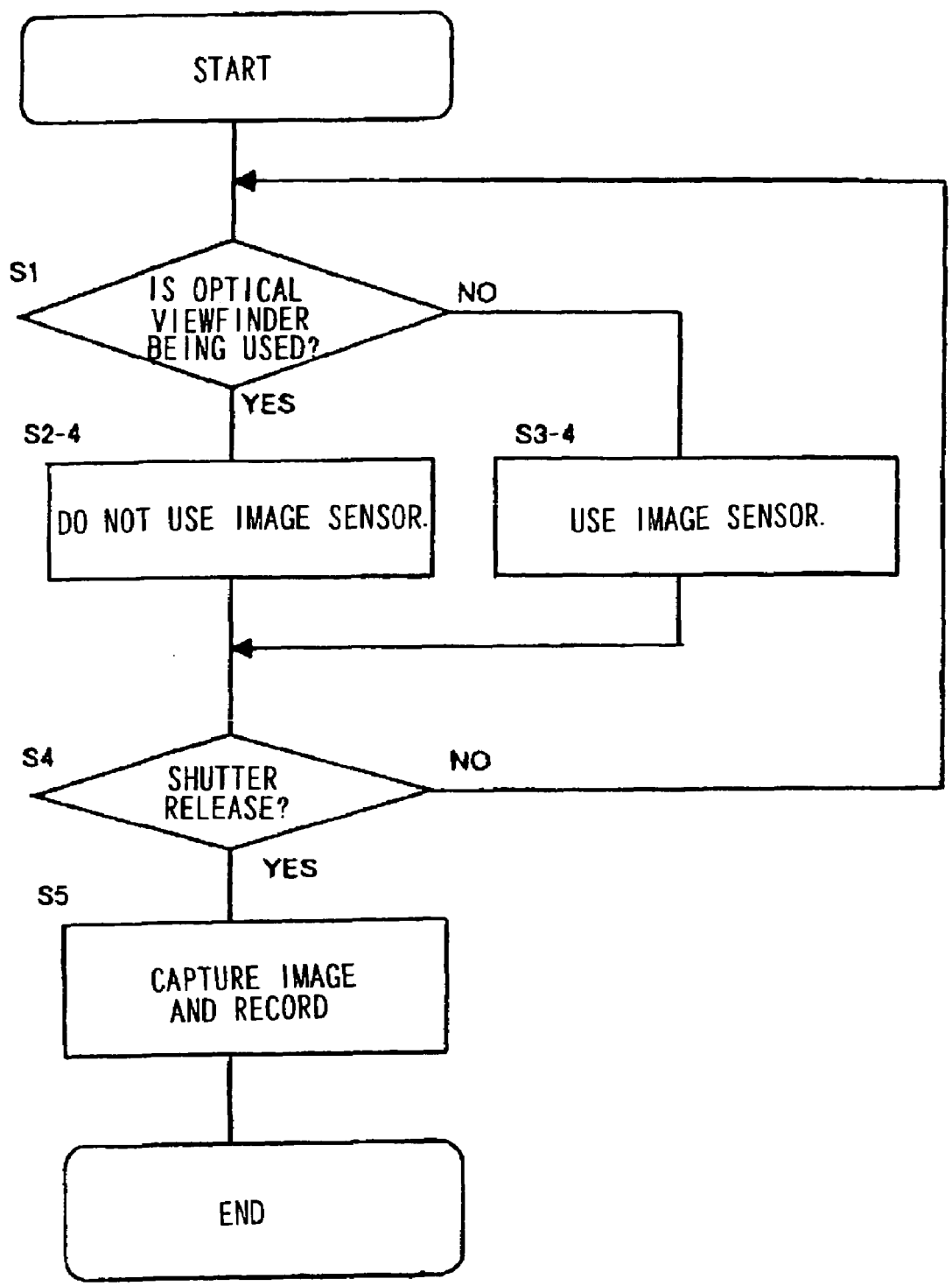
FIG. 10 is flowchart showing a processing procedure for blur correction control by a CPU of the fourth embodiment.

FIG. 10 is flowchart showing a processing procedure for a photographing operation and blur correction operation control executed by the CPU 170 in the fourth embodiment. This processing is started by turning the half-way push down switch 182 on.

In step S1, it is judged as to whether or not the optical viewfinder 150 is being used based on detection results of the eye approach detection section 152 at the used viewfinder determination section 171. If the affirmative judgement is made in step S1 that the optical viewfinder 150 is being used, processing advances to step S2-4.

In step S2-4, the blur correction operation changing section 172 performs setting so that only optical blur correction using the blur correction lens 110 is carried out, without performing electronic blur correction by the electronic blur correction section 174.

On the other hand, if it is judged in step S1 that the optical viewfinder 150 is not being used, that is, that the liquid crystal monitor 160 is being used, processing proceeds to step S3-4.

In step S3-4, the blur correction operation changing section 172 performs setting so that electronic blur correction by the electronic blur correction section 174 is carried out, as well as optical blur correction using the blur correction lens 110.

Continuing on, steps S4 and S5 are the same as in the above described first embodiment, and their descriptions are omitted.

As described above, the blur correction camera of the fourth embodiment of the present invention does not perform electronic blur correction by the electronic blur correction section 174 when the optical viewfinder is being used, while performing both optical blur correction and electronic blur correction when the optical view finder is not being used. In this way, it is possible to reliably detect camera vibration and carry out blur correction with high precision, even if a shift vibration arises as is often in the case when the optical viewfinder is not being used, that is, when the liquid crystal monitor is being used. Also, since correction of image blur caused by rotational vibration of the camera is carried out using the blur correction lens 110, it is possible to carry out the image processing in the electronic blur correction section 174 in a comparatively short time.

Fifth Embodiment

Figure 11:
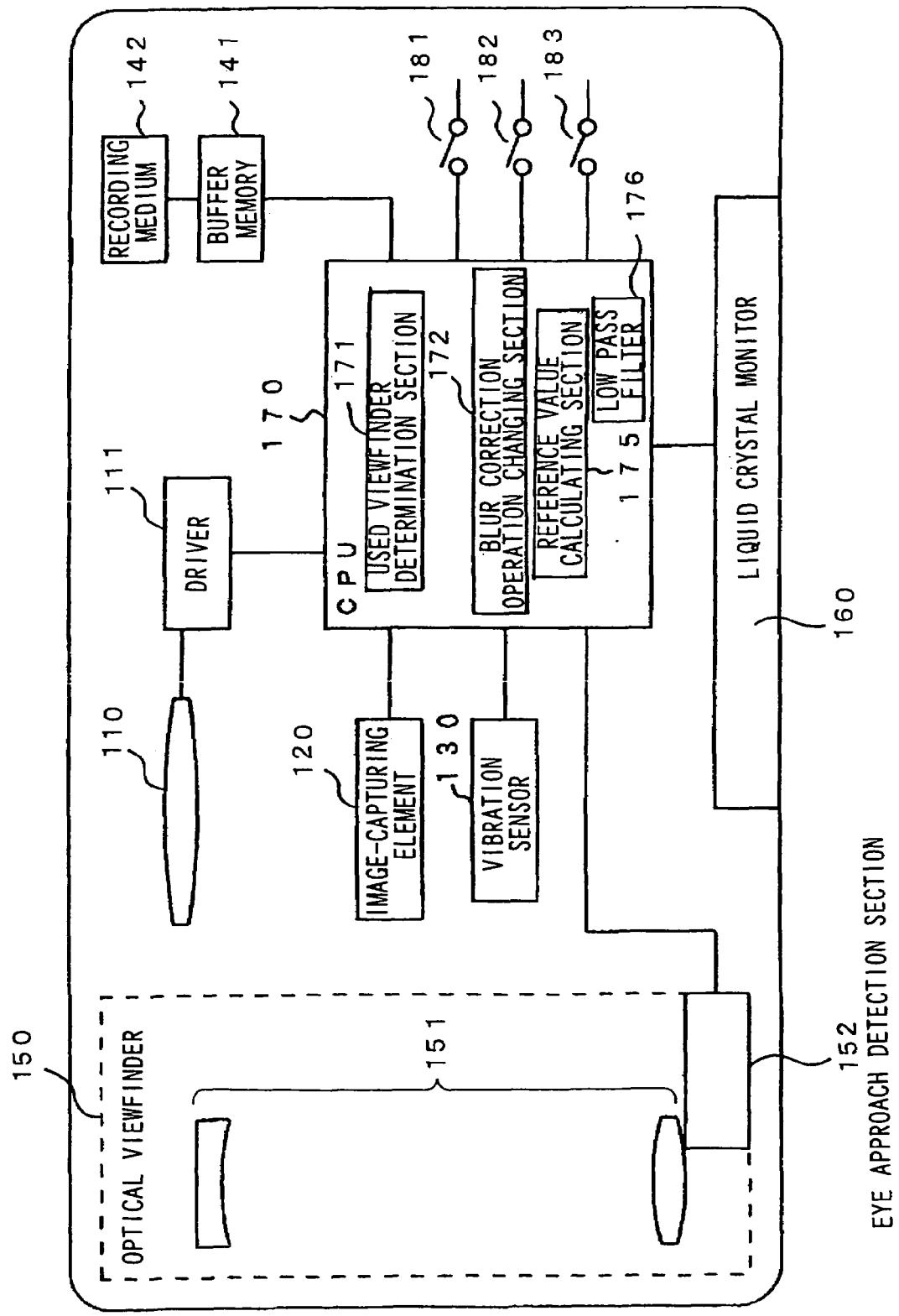
FIG. 11 is a block diagram showing the outline of a blur correction camera of a fifth embodiment.

FIG. 11 is a block diagram showing the outline of a blur correction camera of a fifth embodiment of the present invention. In the fifth embodiment, the blur correction camera of the present invention is applied to a digital still camera, as in the first embodiment. As shown in FIG. 11, the CPU 170 of the blur correction camera of the fifth embodiment also executes control programs functioning as a reference value calculating section 175 and a low pass filter 176.

A detection signal from the vibration sensor 130 was also filtered using a low pass filter in the above described first embodiment, but the cut-off frequency of the low pass filter was fixed to a specified value. Therefore, it was not possible to carry out blur correction for large waves with low frequency generated when the non-ocular viewfinder is being used. The blur correction camera of the fifth embodiment performs blur correction respectively in correspondence with hand vibration occurring when using each viewfinder, by switching the cut-off frequency of the low pass filter 176 according to the viewfinder being used. Sections that are common to the first embodiment have the same reference numerals attached thereto, and their descriptions are omitted.

The reference value calculating section 175 calculates a reference value for calculating drive signals for driving the blur correction lens 110, based on vibration detection signals detected by the angular velocity sensor 130 and having passed through the low pass filter 176. Camera vibration detected by the angular velocity sensor 130 is expressed as a waveform with a particular frequency. As this frequency increases, the wave becomes smaller, and the camera vibration also becomes smaller. On the other hand, as the frequency becomes low, the wave becomes larger, and camera vibration also becomes larger. Camera vibration is detected by the angular velocity sensor 130 as large waves with low frequency attributable to hand vibration, and small waves with high frequency attributable to noise etc. Since it is not necessary to carry out blur correction in response to high frequency waves caused by noise etc., only large waves with low frequency are allowed to pass through the low pass filter 176.

Next, the calculation of the reference value by the reference value calculating section 175 will be described briefly. The reference value calculating section 175 samples detection values detected by the angular velocity sensor 130 at specified time intervals, and calculates a center position of the wave amplitude, namely a reference value. Here, the reference value is equivalent to an output value of the angular velocity sensor 130 with the camera in a resting state. Similarly to the first embodiment, the CPU 170 integrates an angular velocity signal from the angular velocity sensor 130 using thus calculated reference value so as to convert into relative angle signals. The driver 111 of the blur correction lens 110 is engaged to drive in response to thus calculated relative angle signal.

If the sampling interval for detection values of the angular velocity sensor 130 is always fixed, there may be cases where a 0 reference value can not be accurately calculated. For example, in order to calculate a reference value of a high frequency small wave, detection values are sampled three times at a fixed time interval. If sampling is carried out at the same time interval as above to calculate a reference value of a low frequency large wave, the calculated reference value and detected values detected by the angular velocity sensor 130 become close, and it is not possible to calculate accurate reference values.

The sampling interval of the detection values is then changed according to the extent of the camera vibration, namely to the frequency of a wave to be detected by the angular velocity sensor 130. Here, this can be achieved by changing the cut-off frequency of the low pass filter 176. If the cut-off frequency is set to a high value, the time interval for sampling the detection values becomes narrow. Specifically, the number of times that sampling is performed in one second is increased. On the other hand, if the cut-off frequency of the low pass filter 176 is set to a low value, the time interval for sampling the detection values becomes wide. Specifically, the number of times that sampling is performed in one second is reduced.

Blur correction performance is also changed by changing the cut-off frequency of the low pass filter 176. For example, if the cut-off frequency is set low, the sampling interval for the detection values becomes wide, and it is possible to accurately calculate a reference value for a large wave with low frequency. Since the sampling interval is wide, it is not performed on small waves with high frequency and the response during performing image blur correction is slow, however, for a large wave, namely a large vibration, it is possible to carry out blur correction reliably. The reference value calculating section 175 calculates reference values before commencement of blur correction using the blur correction lens 110.

If the optical viewfinder 150 is being used, camera vibration due to hand vibration is small, and so the cut-off frequency is set to a high value. In this way, it is possible to accurately calculate a reference value for a small vibration with high frequency, and to carry out accurate blur correction.

If the optical viewfinder 150 is not being used, there is normally a large hand vibration, and the frequency of camera vibration is low. Therefore, the cut-off frequency is set low so that it is possible to accurately calculate a reference value for a large wave with low frequency.

Figure 12:
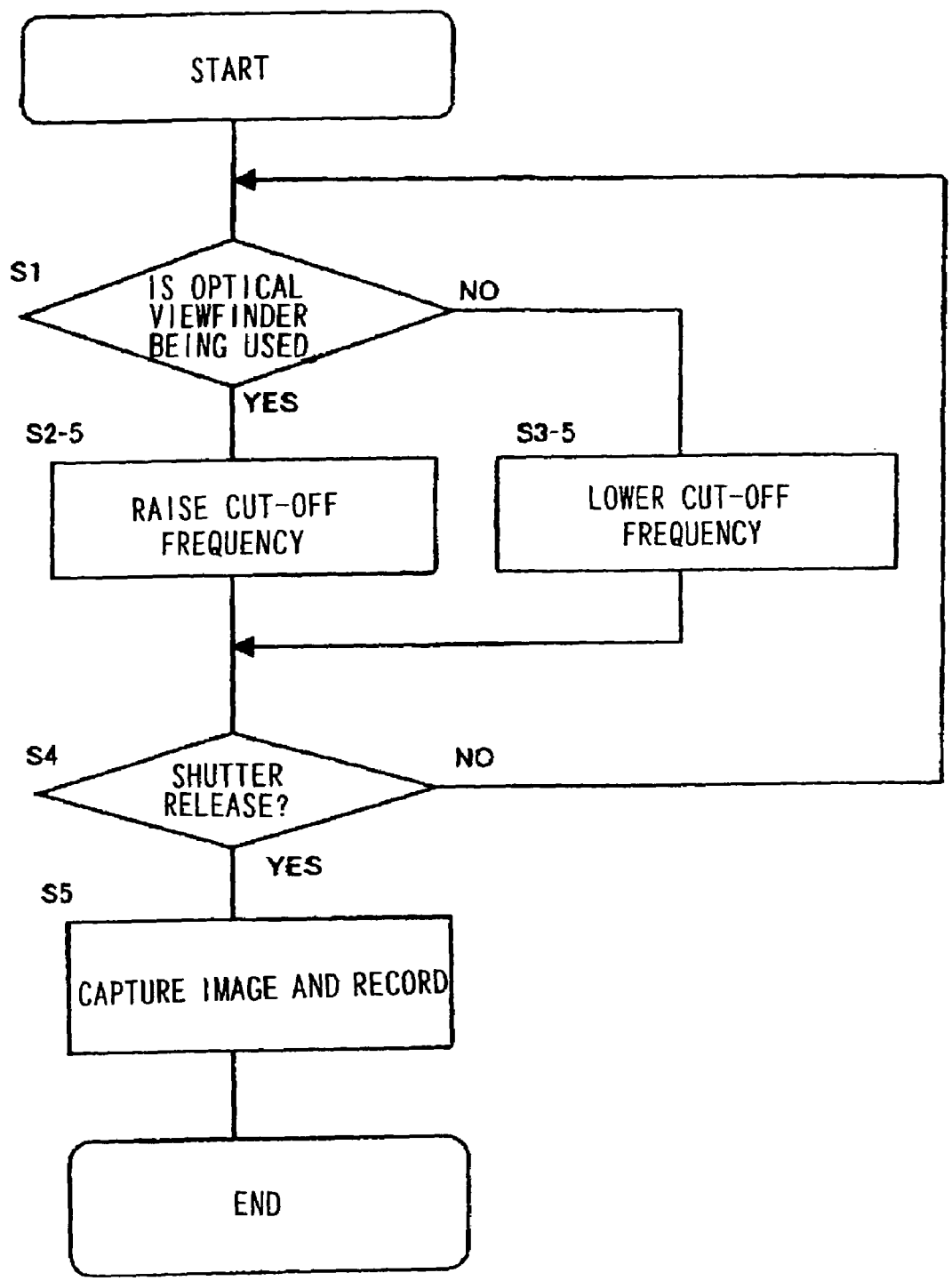
FIG. 12 is flowchart showing a processing procedure for blur correction operation control by a CPU of the fifth embodiment

FIG. 12 is a flowchart showing a processing procedure for a photographing operation and blur correction operation control executed by the CPU 170 in fifth embodiment. This processing is started by turning the half-way push down switch 182 on.

In step S1, it is judged as to whether or not the optical viewfinder 150 is being used based on detection results of the eye approach detection section 152 at the used viewfinder determination section 171. If the affirmative judgement is made in step S1 that the optical viewfinder 150 is being used, processing advances to step S2-5.

In step S2-5, the blur correction operation changing section 172 sets the cut off frequency of the low-pass filter of the reference value calculating section 175 to a high value Q1.

On the other hand, if it is judged in step S1 that the optical viewfinder 150 is not being used, that is, that the liquid crystal monitor 160 is being used, processing proceeds to step S3-5.

In step S3-5, the blur correction operation changing section 172 sets the cut off frequency of the low-pass filter of the reference value calculating section 175 to a low value Q2. It is to be noted that the cut-off frequency Q1> the cut-off frequency Q2.

Next, step S4 and step S5 are the same as in the above described first embodiment, and their descriptions are omitted.

As has been described above, blur correction using the fifth embodiment of the present invention is performed with the cut-off frequency of the low pass filter set to the high value Q1 if the optical viewfinder is being used, and with the cut-off frequency of the low pass filter set to low value Q2 if the optical viewfinder is not being used. By switching the cut-off frequency of the low pass filter according to the viewfinder usage conditions, it is possible to carry out accurate blur correction by calculating optimum reference values according to the viewfinder usage conditions.

Modified Examples

The blur correction camera of the present invention is not limited to the above described embodiments, and various modifications as shown in the following are possible, within the scope of the present invention.

(1) In each of the embodiments, a description is given for an example of a digital still camera for taking still photographs, or a video camera for taking moving pictures. However, it is also possible to apply the embodiments described with the digital still camera to a video camera, and conversely to apply the embodiments described with a video camera to a digital still camera.

It is also possible to apply the present invention to a camera capable of taking both still pictures and moving pictures.

(2) In the fourth embodiment, in the case where the optical viewfinder 150 is not used, shift vibration of the camera is detected based on image signals generated by the image-capturing element 120 and electronic blur correction is carried out. However, it is also possible, for example, to provide an acceleration sensor in addition to the angular velocity sensor as the vibration sensor 130. The acceleration of the camera is detected by the acceleration sensor, and shift vibration of the camera is detected based on the detected values. In this case, it is possible to omit the electronic blur correction section 174. That is, the rotational vibration and shift vibration of the camera are detected based on detected values of the angular velocity sensor and the acceleration sensor, and optical blur correction is carried out using the blur correction lens 110.

(3) In each of the embodiments, the used viewfinder determination section 171 determines the viewfinder in use using signals from the eye approach detection section 152 or the monitor switch 181. However, it is possible, for example, to determine the viewfinder in use using a pressure-sensitive sensor. It is detected using the pressure-sensitive sensor whether or not the photographer's face has come into contact with the camera.

(4) In each of the embodiments, description has been given with an optical view finder as the ocular viewfinder. However, it is also possible, for example, to have an ocular viewfinder using a small monitor. Also, the non-ocular viewfinder is not limited to a liquid crystal viewfinder, and it is also possible to use a plasma display or other display element.

(5) In each of the embodiments, a blur correction device for correcting image blur has been described as an optical blur correction device using the blur correction lens 110. However, it is also possible to use, for example, an electronic blur correction device instead of the optical blur correction device. It is also possible to use a combination of an electronic blur correction device and an optical blur correction device.

Next, the advantages of the blur correction camera of the above described embodiments will be described.

(1) By providing a blur correction operation changing section to change the operation of the blur correction device in correspondence with the determination results from the used viewfinder determination section, it is possible to perform optimum blur correction in response to hand vibration conditions that differ according to the viewfinder used.

(2) By having a composition such that blur correction using the blur correction device is carried out if it is determined by the used viewfinder determination section that the ocular viewfinder is being used, while blur correction using the blur correction device is suspended if it is detected that the non-ocular viewfinder is being used, it is possible to prevent the photographer from relying upon blur correction in the case that the image blur correction is not carried out effectively. Also, since blur correction is not carried out when using the non-ocular viewfinder, the photographer will use the ocular viewfinder when they wish to prevent image vibration. In this way, camera vibration due to unsteady hand movement is reduced so that image blur is also reduced.

(3) In the event that it is determined by the used viewfinder determination section that the non-ocular viewfinder is being used, the range over which blur correction using the blur correction device can be applied becomes large compared to the case when it is determined that the ocular viewfinder is being used. In this way, it is also possible to carry out blur correction when using a non-ocular viewfinder with comparatively large camera vibration. It is also possible to carry out blur correction with high precision when using an ocular viewfinder with comparatively small camera vibration.

Also, when using the ocular viewfinder, the range over which blur correction is carried out is small compared to when using the non-ocular viewfinder. That is, in the case that the blur correction device carries electronic blur correction, it is possible to output a wider region from within the image formed on the image-capturing element, as an output region when the ocular viewfinder is being used. In this way, It is possible to increase the number of pixels of the image to be output and thus obtain a high quality image.

(4) In the event that it is determined by the used viewfinder determination section that the non-ocular viewfinder is being used, the movement member of the optical blur correction device, namely the center bias of the blur correction lens, is set weakly. In this way, it is possible to expand the range over which blur correction using the optical blur correction device can be carried out. Furthermore, it is possible to change the range over which blur correction can be performed with ease without taking a new member etc.

(5) Electronic blur correction is carried out by the electronic blur correction device, without performing optical blur correction using the optical blur correction device if it is determined by the used viewfinder determination section that the non-ocular viewfinder is being used, while optical blur correction using the optical blur correction device is carried out and electronic blur correction by the electronic blur correction device is not carried out if it is determined that the ocular viewfinder is being used. In this way, It is possible to reliably carry out blur correction when there is a large hand vibration when using the non-ocular viewfinder.

(6) Image blur is corrected by the optical blur correction device and the electronic blur correction device if it is determined by the used viewfinder determination section that the non-ocular viewfinder is being used, while image blur is only corrected using the optical blur correction device if it is determined that the ocular viewfinder is being used. Also, in the event that it is determined by the used viewfinder determination section that the non-ocular viewfinder is being used, image blur is corrected based on detection results from the angular velocity sensor and image data generated by the image-capturing element. In this way, it is possible to carry out high precision blur correction when using the ocular viewfinder. When using the non-ocular viewfinder, it is also possible to correct image blur due to shift vibration of the camera that mainly arises when using a non-ocular viewfinder.

(7) Image blur is corrected based on detection results from an angular velocity sensor and an acceleration sensor if it is determined by the used viewfinder determination section that the non-ocular viewfinder is being used, while image blur is corrected based on detection results of the angular velocity sensor if it is determined that the ocular viewfinder is being used. In this way, it is possible to carry out high precision blur correction when using the ocular viewfinder. Furthermore, when using the non-ocular viewfinder, it is possible to correct image blur attributable to shift vibration of the camera that mainly arises when using a non-ocular viewfinder.

(10) If the used viewfinder determination section determines that the non-ocular viewfinder is being used, the cut-off frequency of a low pass filter is set to a low value compared to when it is determined that the ocular viewfinder is being used. In this way, regardless of whether the ocular viewfinder is being used or whether the non-ocular viewfinder is being used, it is possible for the reference value calculation section to calculate an accurate reference value so that more accurate blur correction can be carried out.

What is claimed is:

1. An image blur correction camera, comprising:
a photographing optical system;
an image-capturing element that captures an image of a subject through the photographing optical system;
a vibration detection section that detects camera vibration;
a blur correction device that performs an image blur correction for correcting blur of the image of the subject captured by the image-capturing element according to detection results of the vibration detection section;
an ocular viewfinder for observing the subject with a user's eyes in close contact;
a non-ocular viewfinder for observing the subject with the user's eyes at a distance; and
a used viewfinder determination section that determines which of the ocular viewfinder and the non-ocular viewfinder is being used; wherein
the blur correction device carries out a first correction operation for the image blur correction when the used viewfinder determination section has determined that the ocular viewfinder is being used, and carries out a second correction operation for the image blur correction which is different from the first correction operation when the used viewfinder determination section has determined that the non-ocular viewfinder is being used.

2. An image blur correction camera of claim 1, wherein:
the blur correction device carries out the second correction operation so that a range over which the image blur correction can be carried out becomes wider than that of the first correction operation.

3. An image blur correction camera of claim 2, wherein:
the blur correction device comprises an optical blur correction device that corrects image blur by moving a movement member so as to make a change in relative position between the image of the subject formed on the image-capturing element and the image-capturing element itself; and
the blur correction device carries out the second correction operation to expand an operable range of the movement member so as to expand the range over which the image blur correction can be carried out.

4. An image blur correction camera of claim 2, wherein:
the blur correction device comprises an optical blur correction device that corrects image blur by moving a movement member so as to make a change in relative position between the image of the subject formed on the image-capturing element and the image-capturing element itself; and
the blur correction device carries out the second correction operation to set a center bias of the movement member weakly so as to expand the range over which the image blur correction can be carried out.

5. An image blur correction camera of claim 3, wherein the movement member is part of the photographing optical system.

6. An image blur correction camera of claim 4, wherein: the movement member is part of the photographing optical system.

7. An image blur correction camera of claim 1, wherein:
the vibration detection section comprises an angular velocity sensor that detects angular velocity of the camera; and
the blur correction device carries out the second correction operation based on detection results from the angular velocity sensor and image data generated by the image-capturing element, and carries out the first correction operation based on detection results from the angular velocity sensor.

8. An image blur correction camera of claim 1, wherein:
the vibration detection sensor comprises an angular velocity sensor that detects angular velocity of the camera and an acceleration sensor that detects acceleration of the camera; and
the blur correction device carries out the second correction operation based on detection results of the angular velocity sensor and the acceleration sensor, and carries out the first correction operation based on detection results from the angular velocity sensor.

9. An image blur correction camera of claim 1, further comprising:
a low-pass filter that passes waves with frequency lower than a set cut-off frequency; and wherein
the cut-off frequency of the low pass filter is changed depending on which of the first correction operation and the second correction operation is to be carried out.

10. An image blur correction camera of claim 9, wherein: when the second correction operation is to be carried out, the cut-off frequency of the low pass filter is set to a value that is lower than that of when the first correction operation is to be carried out.

11. An image blur correction camera of claim 9, wherein: the vibration detection section comprises an angular velocity sensor that detects angular velocity of the camera.

12. An image blur correction camera of claim 1, wherein:
the blur correction device comprises an optical blur correction device that corrects image blur by moving a movement member so as to make a change in relative position between the image of the subject formed on the image-capturing element and the image-capturing element itself, and an electronic blur correction device that corrects image blur by subjecting image data generated by the image-capturing element to image processing; and
the blur correction device carries out the second correction operation by using the optical blur correction device and the electronic blur correction device, or by using the electronic blur correction device, and carries out the first correction operation by using the optical blur correction device.

13. An image blur correction camera of claim 12, wherein:
the vibration detection section comprises an angular velocity sensor that detects angular velocity of the camera; and
the optical blur correction device corrects image blur based on detection results of the angular velocity sensor.

14. An image blur correction camera, comprising:
an image-capturing element that captures an image of a subject through a photographing optical system;
a vibration detection section that detects vibration of the camera;
a blur correction signal output section that outputs blur correction signals to a blur correction device that performs an image blur correction for correcting blur of the image formed by the image-capturing element according to detection results from the vibration detection section;
an ocular viewfinder for observing the subject with a user's eyes in close contact;
a non-ocular viewfinder for observing the subject with the user's eyes at a distance; and
a used viewfinder determination section that determines which of the ocular viewfinder and the non-ocular viewfinder to is being used; wherein
the blur correction signal output section outputs to the blur correction device a signal for carrying out a first correction operation for the image blur correction when the used viewfinder determination section has determined that the ocular viewfinder is being used, and a signal for carrying out a second correction operation for the image blur correction which is different from the first correction operation when the used viewfinder determination section has determined that the non-ocular viewfinder is being used.

15. An image blur correction camera of claim 14, wherein: when the second correction operation is to be carried out, the blur correction signal output section outputs the signal for making a range over which the blur correction device is capable of performing the image blur correction larger than that of when the first correction operation is to be carried out.

16. An image blur correction camera of claim 15, wherein:
the blur correction signal output section outputs the signals so as to change a range of movement of a movement member included in an optical blur correction device which makes a change in a relative position between the image of the subject formed on the image-capturing element and the image-capturing element itself for correcting image blur; and
the blur correction signal output section outputs the signal for expanding the moveable range of the movement member to increase a range over which the image blur correction can be carried out when the second correction operation is to be carried out.

17. An image blur correction camera of claim 15, wherein:
the blur correction signal output section outputs the signals so as to change a center bias of a movement member included in an optical blur correction device that makes a change in a relative position between the image of the subject formed on the image-capturing element and the image-capturing element itself for correcting image blur; and
the blur correction signal output section outputs the signal for setting the center bias of the movement member weakly to increase a range over which the image blur correction can be carried out when the second correction operation is to be carried out.

18. An image blur correction camera of claim 14, wherein:
the vibration detection section comprises an angular velocity sensor that detects angular velocity of the camera; and
the blur correction signal output section outputs the signal for the image blur correction based on detection results from the angular velocity sensor and image data generated by the image-capturing element when the second correction operation is to be carried out, and outputs the signal for the image blur correction based on detection results from the angular velocity sensor when the first correction operation is to be carried out.

19. An image blur correction camera of claim 14, wherein:
the vibration detection section comprises an angular velocity sensor that detects angular velocity of the camera, and an acceleration sensor that detects acceleration of the camera; and
the blur correction signal output section outputs the signal for the image blur correction based on detection results from the angular velocity sensor and the acceleration sensor when the second correction operation is to be carried out, and outputs the signal for the image blur correction based on detection results from the angular velocity sensor when the first correction operation is to be carried out.

20. An image blur correction camera of claim 14, further comprising:
a low-pass filter that passes waves with frequency lower than a set cut-off frequency; and wherein
the cut-off frequency of the low pass filter is changed depending on which of the first correction operation and the second correction operation is to be carried out.

21. An image blur correction camera of claim 20, wherein:
when the second correction operation is to be carried out, the cut-off frequency of the low pass filter is set to a value that is lower than that of when the first correction operation is to be carried out.

22. An image blur correction camera of claim 20, wherein:
the vibration detection section comprises an angular velocity sensor that detects angular velocity of the camera.

23. An image blur correction camera of claim 14, further comprising:
an electronic blur correction device that corrects image blur by subjecting image data generated by the image-capturing element to image processing; and wherein
the blur correction signal output section outputs blur correction signals to an optical blur correction device which makes a change in a relative position between the image of the subject formed on the image-capturing element and the image-capturing element itself using a movement member for correcting image blur, and to the electronic blur correction device; and
the blur correction signal output section outputs the signal for carrying out the image blur correction by using the optical blur correction device and the electronic blur correction device, or by using the electronic blur correction device when the second correction operation is to be carried out, and outputs the signal for carrying out the image blur correction by using the optical blur correction device when the first correction operation is to be carried out.

24. An image blur correction camera of claim 23, wherein:
the vibration detection section comprises an angular velocity sensor that detects angular velocity of the camera; and
the blur correction signal output section outputs the signal to the optical blur correction device for correcting image blur based on detection results of the angular velocity sensor.

25. A method for controlling of image blur correction for a camera, comprising:
capturing an image of a subject;
detecting vibration of the camera;
determining which of an ocular viewfinder and a non-ocular viewfinder is being used, with the ocular viewfinder being used for observing a subject with a user's eyes in close contact and the non-ocular viewfinder being used for observing the subject with the user's eyes at a distance;
performing an image blur correction for correcting blur of the captured image of the subject according to detection results of the vibration of the camera;
carrying out a first correction operation for the image blur correction when it has been determined that the ocular viewfinder is being used, and
carrying out a second correction operation for the image blur correction which is different from the first correction operation when it has been determined that the non-ocular viewfinder is being used.

26. A method for controlling of image blur correction for a camera according to claim 25, wherein:
the second correction operation is carried out so that a range over which the image blur correction can be carried out becomes wider than that of the first correction operation.

27. A method for controlling of image blur correction for a camera according to claim 26, wherein:
the image blur correction is carried out by moving a movement member of an optical blur correction device; and
the range over which the image blur correction can be carried out is expanded by expanding an operable range of the movement member when the second correction operation is to be carried out.

28. A method for controlling of image blur correction for a camera according to claim 26, wherein:
the image blur correction is carried out by moving a movement member of an optical blur correction device; and
a center bias of the movement member is set weakly so as to expand the range over which the image blur correction can be carried out when the second correction operation is to be carried out.

* * * * *